US 12,174,839 B2

(12) United States Patent
Bai et al.

(10) Patent No.: US 12,174,839 B2
(45) Date of Patent: Dec. 24, 2024

(54) RELEVANT PASSAGE RETRIEVAL SYSTEM

(71) Applicant: MICROSOFT TECHNOLOGY LICENSING, LLC, Redmond, WA (US)

(72) Inventors: Jing Bai, Redmond, WA (US); Yue-Sheng Liu, Redmond, WA (US); Jan O. Pedersen, Redmond, WA (US); Mao Yang, Redmond, WA (US); Qi Lu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 675 days.

(21) Appl. No.: 16/303,274

(22) PCT Filed: May 23, 2016

(86) PCT No.: PCT/CN2016/082980
§ 371 (c)(1),
(2) Date: Nov. 20, 2018

(87) PCT Pub. No.: WO2017/201647
PCT Pub. Date: Nov. 30, 2017

(65) Prior Publication Data
US 2019/0303375 A1    Oct. 3, 2019

(51) Int. Cl.
*G06F 16/955* (2019.01)
*G06F 16/2457* (2019.01)
(Continued)

(52) U.S. Cl.
CPC .... *G06F 16/24578* (2019.01); *G06F 16/3344* (2019.01); *G06F 16/345* (2019.01);
(Continued)

(58) Field of Classification Search
CPC ............... G06F 16/3344; G06F 40/289; G06F 16/243; G06F 16/24578; G06F 16/9558; G06F 16/9535; G06F 16/345; G06N 20/00
See application file for complete search history.

(56) References Cited

U.S. PATENT DOCUMENTS 7,856,350 B2  12/2010  Zhou et al.
8,275,803 B2   9/2012  Brown et al.
(Continued)

FOREIGN PATENT DOCUMENTS

CN   101246484 A   8/2008
CN   101523338 A   9/2009
(Continued)

OTHER PUBLICATIONS

Ofoghi, Bahadorreza, John Yearwood, and Ranadhir Ghosh. "A semantic approach to boost passage retrieval effectiveness for question answering." In Proceedings of the 29th Australasian Computer Science Conference—vol. 48, pp. 95-101. 2006. (Year: 2006).*
(Continued)

*Primary Examiner* — Jesse P Frumkin
(74) *Attorney, Agent, or Firm* — Faegre Drinker Biddle & Reath LLP

(57) ABSTRACT

A new architecture is provided to support a precise information retrieval system on a web scale. The architecture provides algorithms to generate candidates and select the top N results via ranking models (e.g., Semantic ranking models, Aggregation ranking models) to capture term relationships between query and result contents at search-time.

20 Claims, 16 Drawing Sheets

(51) Int. Cl.
  *G06F 16/33* (2019.01)
  *G06F 16/34* (2019.01)
  *G06F 16/9535* (2019.01)
  *G06N 20/00* (2019.01)

(52) U.S. Cl.
  CPC ...... *G06F 16/9535* (2019.01); *G06F 16/9558* (2019.01); *G06N 20/00* (2019.01)

(56) References Cited

U.S. PATENT DOCUMENTS

| | | | |
|---|---|---|---|
| 9,323,831 | B2 | 4/2016 | Chu-Carroll et al. |
| 9,940,367 | B1* | 4/2018 | Baker ................ G06F 16/9535 |
| 10,180,964 | B1* | 1/2019 | Baker ................ G06F 16/953 |
| 10,783,156 | B1* | 9/2020 | Baker ............... G06F 16/24578 |
| 2001/0000356 | A1 | 4/2001 | Woods |
| 2005/0187768 | A1* | 8/2005 | Godden ................ G10L 15/08 704/238 |
| 2005/0256700 | A1 | 11/2005 | Moldovan et al. |
| 2006/0190258 | A1* | 8/2006 | Verhasselt ............ G10L 15/19 704/E15.021 |
| 2006/0195440 | A1* | 8/2006 | Burges ................ G06F 16/9535 707/999.005 |
| 2008/0301174 | A1 | 12/2008 | Mons et al. |
| 2009/0070322 | A1* | 3/2009 | Salvetti ................ G06F 16/338 707/999.005 |
| 2009/0089277 | A1* | 4/2009 | Cheslow ............... G06F 16/243 |
| 2011/0246181 | A1* | 10/2011 | Liang .................... G06F 40/289 704/9 |
| 2013/0124534 | A1* | 5/2013 | Dinh .................... G06F 16/338 707/748 |
| 2014/0297571 | A1* | 10/2014 | Beamon ................. G06F 16/61 706/12 |
| 2014/0330819 | A1* | 11/2014 | Raina ................ G06F 16/24565 707/723 |
| 2015/0340033 | A1* | 11/2015 | Di Fabbrizio .......... G10L 15/22 704/254 |
| 2016/0078102 | A1 | 3/2016 | Crouch et al. |
| 2016/0147871 | A1* | 5/2016 | Kalyanpur ........... G06F 40/284 707/728 |
| 2017/0140304 | A1* | 5/2017 | Beamon ................ G06F 16/61 |
| 2020/0162531 | A1* | 5/2020 | Gregory ............... G06F 3/0484 |
| 2020/0184532 | A1* | 6/2020 | Roy Chowdhury ........................ G06F 16/9535 |

FOREIGN PATENT DOCUMENTS

| | | |
|---|---|---|
| CN | 102323955 A | 1/2012 |
| CN | 105247517 A | 1/2016 |
| JP | 2005-301444 A | 10/2005 |
| WO | 2009/035871 A1 | 3/2009 |
| WO | 2016/015267 A1 | 2/2016 |

OTHER PUBLICATIONS

"Extended Search Report Issued in European Patent Application No. 16902637.4", Mailed Date: Dec. 3, 2019, 9 Pages.

Tellex et al., "Quantitative Evaluation of Passage Retrieval Algorithms for Question Answering", In Proceedings of the 26th Annual International ACM SIGIR Conference on Research and Development in Information Retrieval, Jul. 28, 2003, 7 pages.

Wan et al., "Passage Retrieval with Vector Space and Query-Level Aspect Models", In Proceedings of the Sixteenth Text Retrieval Conference, Nov. 6, 2007, 10 pages.

Xu et al., "Passage Retrieval for Information Extraction using Distant Supervision", In Proceedings of the 5th International Joint Conference on Natural Language Processing, Nov. 8, 2011, 9 pages.

Llopis et al., "Passage Selection to Improve Question Answering", In Proceedings of conference on multilingual summarization and question answering, vol. 19, Aug. 2002, 6 pages.

Li, Rongmei, "The State-of-the-arts in Focused Search", Retrieved on: May 31, 2016, 16 pages, http://doc.utwente.nl/67516/1/focusedSearch.pdf.

Keikha, et al., "Retrieving Passages and Finding Answers", In Proceedings of Australasian Document Computing Symposium, Nov. 27, 2014, 4 pages.

International Search Report and Written Opinion for PCT/CN2016/082980, mailed Feb. 24, 2017.

"First Office Action and Search Report Issued in Chinese Patent Application No. 201680086072.X", Mailed Date: Mar. 3, 2021, 13 Pages.

"Second Office Action and Search Report Issued in Chinese Patent Application No. 201680086072.X", Mailed Date: Aug. 18, 2021, 11 Pages.

Sankepally, et al., "An Aggregate Search Model for Web Search Engines: An Empirical Study", In IEEE/WIC/ACM International Joint Conferences on Web Intelligence (WI) and Intelligent Agent Technologies (IAT), vol. 3, Nov. 17, 2013, pp. 288-289.

Zhao, Feiyu, "A Random Walk Based Win/Loss Graph Aggregation Algorithm for News Metasearch Engine", In Dissertation of Master Degree of Xihua University, Apr. 2013, 68 Pages.

\* cited by examiner

Semantic TM Probability

| Source (Query) | Target (Passage) | Probability (Target / Source) | Probability (Source / Target) |
|---|---|---|---|
| california_king | california_king_bed | 0.00268 | 0.22764 |
| california_king | cal_king | 0.00933 | 0.11795 |
| california_king | king_mattress | 0.00150 | 0.00314 |
| california_king | long | 0.01164 | 0 |
| california_king | inch | 0.00596 | 0 |
| ...... | ... | ... | ... |
| king_frame | inch | 0.22311 | 0 |
| king_frame | king_mattress | 0.12194 | 0.02997 |
| king_frame | bed_frame | 0.12277 | 0 |
| ...... | ... | ... | ... |

FIG. 8

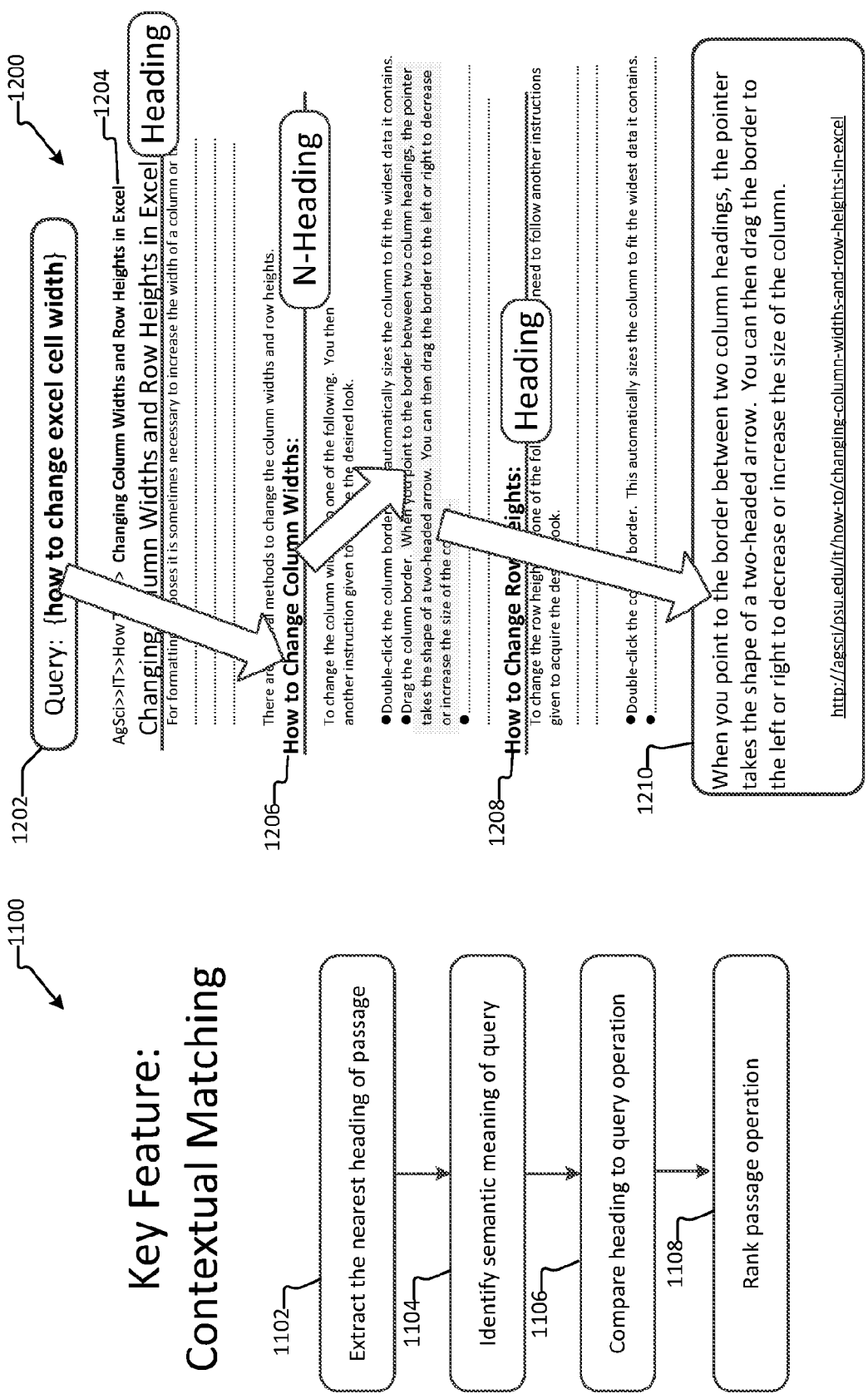

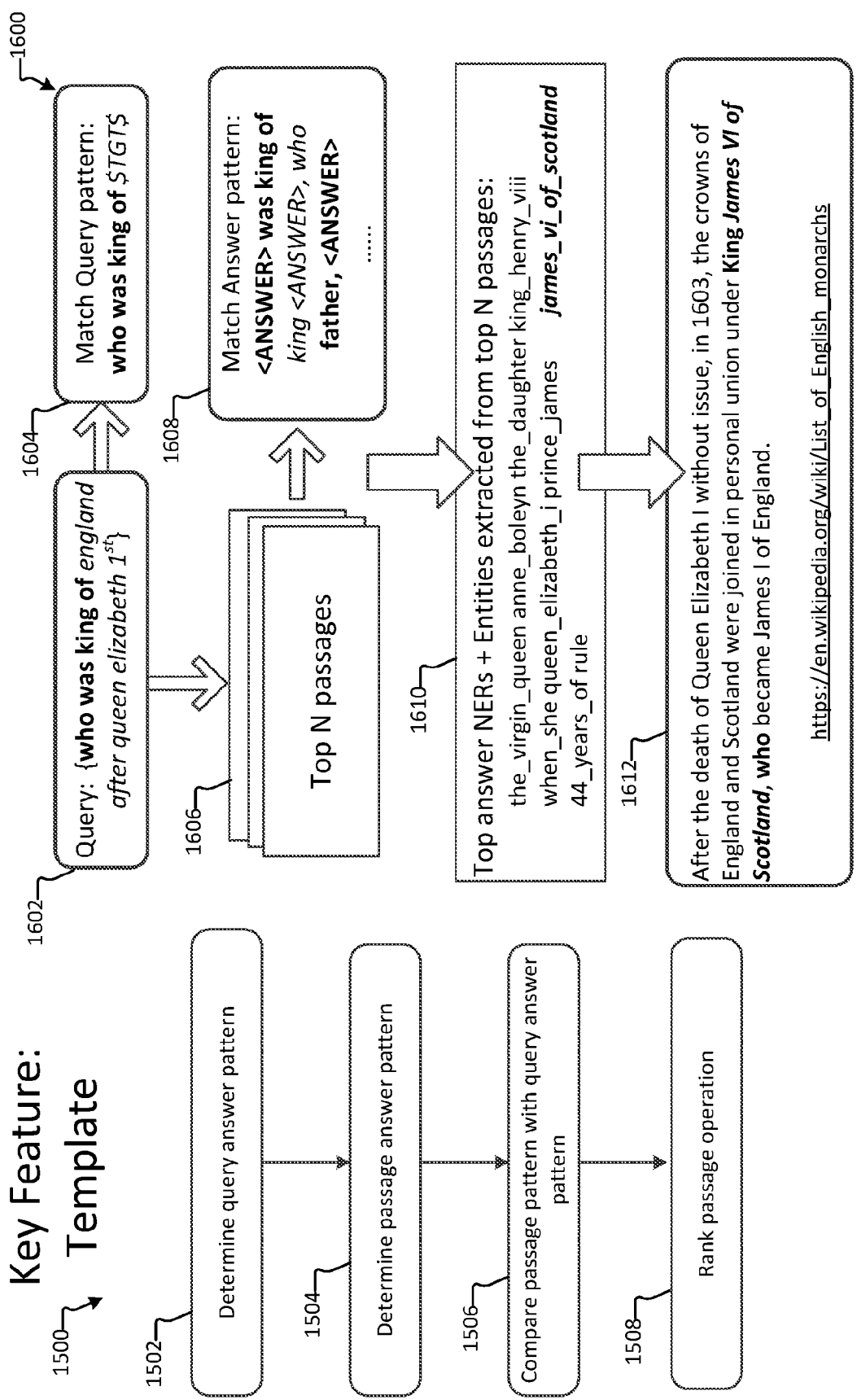

RELEVANT PASSAGE RETRIEVAL SYSTEM

CROSS-REFERENCE TO RELATED APPLICATION

This application is a U.S. National Stage Application of PCT/CN2016/082980, filed May 23, 2016, which application is hereby incorporated by reference. To the extent appropriate, a claim of priority is made to the above disclosed application.

BACKGROUND

Users of computing systems run searches for electronic objects using queries. For example, users run searches on the Internet, email systems, video archives, and other databases. As the number of electronic objects being stored grows, it is becoming increasingly challenging to search a corpus of electronic objects and return relevant results to a user. Further, users increasingly expect to quickly access information relevant to the query without having to access the various electronic objects that may be returned by the query. This is particularly true for queries that are submitted using a mobile device. The small form factor of mobile devices makes it more difficult for users to sift through the electronic objects returned in response to a query. Because of this, it is beneficial to provide a mechanism in which an answer to a query is provided directly to the user without requiring the user to actually access an electronic object to find the answer.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Aspects of the present technology relate to returning results from user queries. For example, a user may provide a query, such as a natural language query, seeking information into a web browser, an email search interface, or cloud search interface, a file system search interface, or any other type of search interface. Aspects of the technology described herein provide systems and methods to identify highly relevant passages from a corpus of electronic objects (such as the web pages, word processing documents, spreadsheets, videos, etc.) and return the most relevant passage(s) that answers the user query. The passage may be obtained directly from the electronic object or may be generated from multiple, highly-ranked passages from one or more electronic objects. Other information may be returned such as the location of the electronic object from where the passage(s) was obtained. This may be a URL link, an email link, or other object link.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 8 illustrates an example output resulting from identifying features of a passage based on a query and a sample target electronic object.

FIG. 11 illustrates an exemplary method of matching an electronic object to a query based on contextual meaning.

FIG. 12 provides an example of matching an electronic object to a query based on a heading of the electronic object.

FIG. 15 illustrates an exemplary method of matching answer patterns in passages to query answer patterns for queries.

FIG. 16 provides an example of the results generated using a method of matching answer patterns to queries.

DETAILED DESCRIPTION

Figure 1:
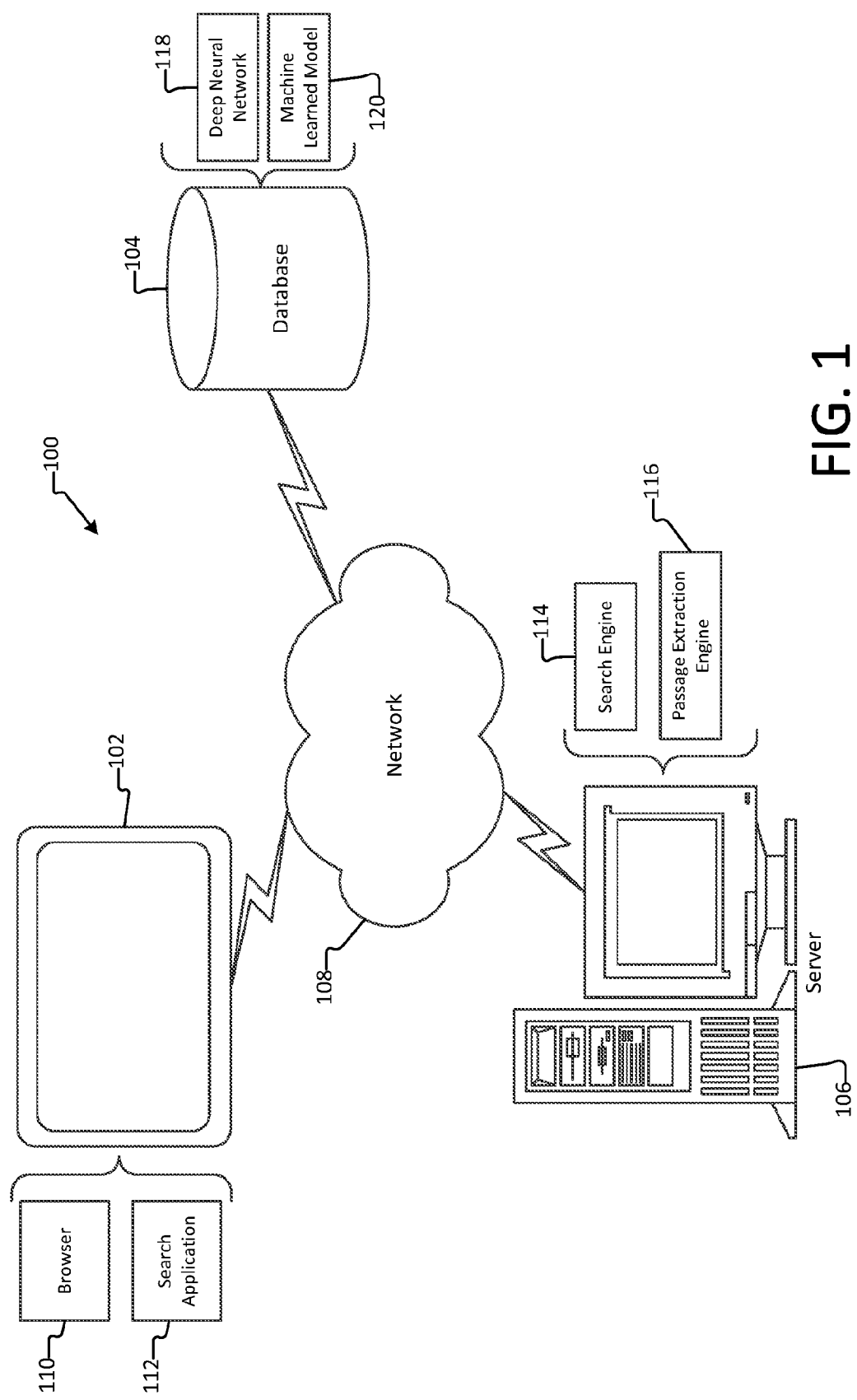
FIG. 1 illustrates an exemplary networked-computing environment for retrieving relevant passages from a corpus of electronic objects.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Existing search systems retrieve electronic objects, or links to electronic objects, as results. For example, a web search system may retrieve URL links to web pages in response to a query while a file system search interface may retrieve one or more files. Generally, the results returned from existing search systems are not the "precise information" that the user who submitted the query is looking for. For example, in the case of a web search system, the user must click one of the returned URL links to access an electronic object which actually contains the information that the user is looking for.

In this disclosure, the term "passage" is used. A passage is a piece of information or content that provides more direct fulfillment of a user's search intent. For example, in response to Internet search query, rather than just retuning a list of URLs, the content of a group of URLs is searched to identify and extract the relevant information to answer the query. A passage, either generated or extracted from the URLs, will be returned to the user. It will be appreciated that, while this disclosure often refers to URLs and returning text based passages, this disclosure is not so limited. A passage is not limited to text information. In various aspects a passage can be an image, video, and/or a combination of different information.

Additionally, this disclosure discusses identifying the semantic meaning or words, phrases, (e.g., any n-gram). As a specific example, semantic meaning may be interpreted using keywords and entities between a query and a passage. Keywords are words may be helpful in determining intents and domains of sentences, phrases, and passages in an electronic object as well as a query. Entities are similar to keywords, but additionally are words or phrases that have, as used in the context of the natural language query or passage, an alternative meaning than the literal definition. For example, the words "super bowl" typically would not literally mean an excellent stadium, but normally refers the championship game of the National Football League.

Aspects of the present technology include the use of machine-learned models. The machine learned models will use a set of training data to learn how to recognize semantic patterns in natural language. The training data will be tagged in such a way as to train the model for a particular task. For example, when identifying key words in a sentence, the model will be trained to recognize California king as one entity related to mattresses, and not necessarily a monarch of the state of California. One of skill in the art will appreciate that various different types of machine learning approaches and models can be employed by the technology disclosed herein including, but not limited to, decision tree learning, association rule learning, artificial neural networks, deep learning, support vector machines, Bayesian networks, etc.

As a non-limiting example, a user may submit the following query to an Internet search engine: "Will a California king fit on a king frame?" In response to receiving this query, a traditional search engine will provide a list of links to web pages that were identified as related to the query. Rather than, or in addition to, providing the most relevant links based on a key-word search, aspects of the technology described herein returns an answer such as "A standard king-sized bed frame measures 76 inches wide by 80 inches long. A California king measures 72 inches wide and 85 inches long, making it five inches longer but four inches narrower than a standard king-size mattress." Thus, the technology described herein may be applied to identify/generate a passage that provides a more narrowly tailored answer to this and other queries, thereby making the precise information available to the user in faster than traditional search systems.

Aspects disclosed herein relate to a retrieval system for finding the relevant passages from across an entire web of electronic objects, such as the Internet. Additionally, electronic object ranking and passage ranking algorithms and techniques are disclosed. As such, in addition to providing other benefits, aspects of the technology disclosed herein not provide improvements to the coverage of existing answer retrieval systems but also provide more precise passages by using web ranking algorithms and techniques. For ease of illustration, various aspects of the disclosure are described with respect to providing passages identified or synthesized using web content. However, one of skill in the art will appreciate that the technologies described herein can be employed across various different types of content stores such as, but not limited to, databases, file systems, email mailboxes and/or archives, social media networks, etc.

Turning now to FIG. 1, FIG. 1 illustrates a networked-computing environment 100 for retrieving relevant passages from a corpus of electronic objects. The corpus of electronic objects is defined by the electronic objects that are accessible by a search application. The size of the corpus of electronic objects may vary depending on the type of search application. For example, the corpus of documents available to a file system search application is limited to the electronic objects stored on the file system. The corpus of electronic objects available to a web search application, however, may include every electronic object that is accessible on the Internet. As illustrated, FIG. 1 includes a computing device 102, a networked-database 104, and a server 106, each of which is communicatively coupled to each other via a network 108.

The computing device 102 may be any suitable type of computing device. For example, the computing device 102 may be one of a desktop computer, a laptop computer, a tablet, a mobile telephone, a smart phone, a wearable computing device, or the like. Additionally, aspects of the current technology include the computing device storing a browser 110 and a search application 112.

A browser 110 may be an interact search browser. A user may input search queries to the browser 110 through a variety of means including text, touch, gesture, or spoken language. The browser 110 may be configured to receive the query and transmit the query to a search engine stored on one or more servers, such as search engine 114 stored on server 106.

As illustrated, the computing device 102 includes a search application 112. The search application 112 may be a search application programmed to receive queries for searching electronic objects such as emails, video files, word processing documents, etc. In certain aspects, the received input is a natural language query. The received query may be sent to the server 106. Aspects of the technology include the search application 112 having the ability to receive queries though text, touch, and/or speech input. The search engine 114 may be configured to receive the query and transmit the query to a search engine stored on one or more servers, such as search engine 114 stored on server 106.

System 100 may also include a database 104. The database 104 may be used to store a variety of information to aid in retrieving relevant passages from a corpus of electronic objects. For example, a Deep Neural Network 118 ("DNN") and a machine learned model 120 may be provided to the server 106 to aid in retrieving relevant passages from a corpus of electronic objects.

As illustrated, a search engine 114 and a passage extraction engine 116 may reside on a remote device, such as server 106. In other examples, however, the search engine 114 and a passage extraction engine 116 may be stored on another computing device, such as computing device 102. One or both of the search engine 114 and the passage extraction engine 116 receives queries from computing devices such as computing device 102. The search engine 114 receives a query and, using the query, identifies a corpus of potential electronic objects that may satisfy the query. In aspects of the technology, the passage extraction engine 116 identifies, analyzes, and ranks the passages within a corpus of electronic objects, such as those objects identified by the search engine 114.

Network 108 facilitates communication between devices, such as computing device 102, database 104, and server 106. The network 108 may include the Internet and/or any other type of local or wide area networks. Communication between devices allows for the exchange of queries, information related to the corpus of electronic objects, relevant passages, and other information.

Figure 2:
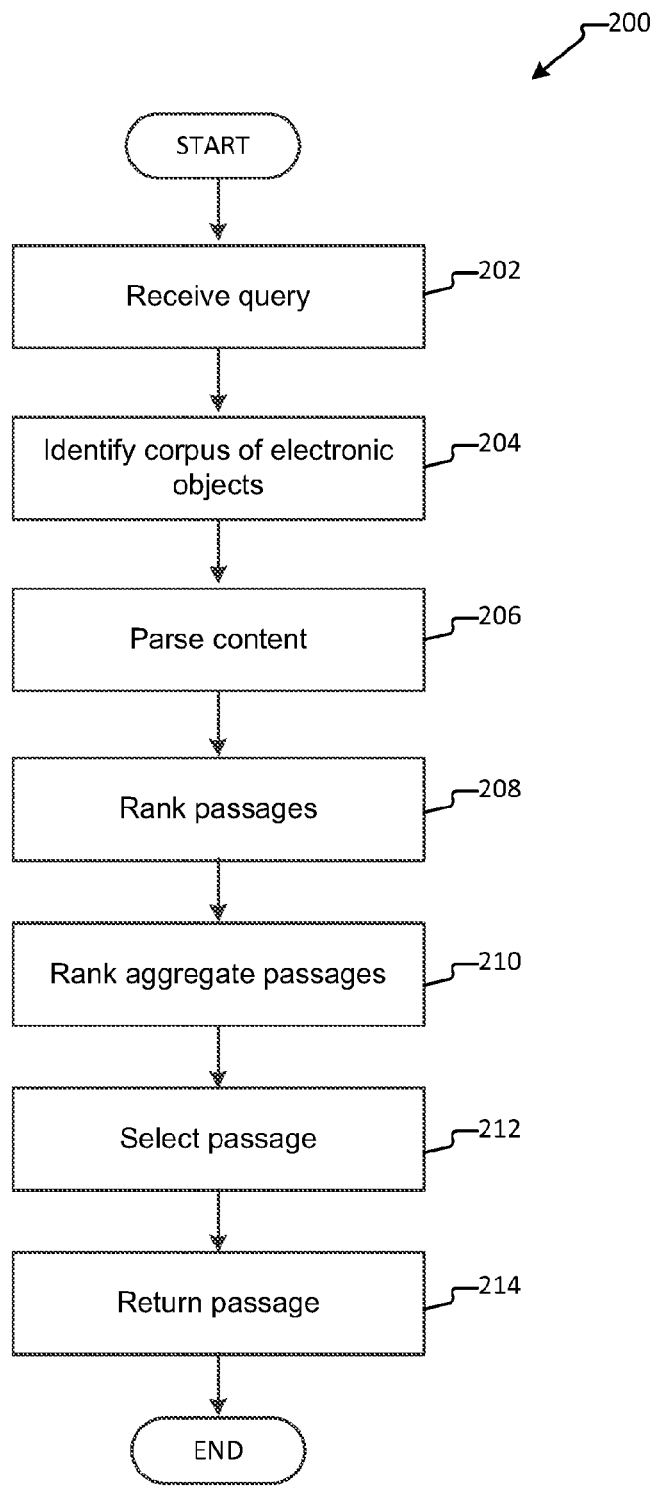
FIG. 2 illustrates an exemplary method for providing a passage.

FIG. 2 illustrates a method 200 for providing a passage. In examples, method 200 may be executed on a device comprising at least one processor configured to store and execute operations, programs or instructions. However, method 200 is not limited to such examples. In other examples, method 200 may be performed on an application or service for providing the storage and/or manipulation of user input. In at least one example, method 200 may be executed (e.g., computer-implemented operations) by one or more components of a distributed network, such as a web service/distributed network service (e.g. cloud service). Method 200 begins with receive query operation 202. In receive query operation 202, a query is received. The query may be a natural language query received by a search application, a web browser, a personal digital assistant, etc. In other aspects, the query is a structured query that conforms to a specific syntax.

Method 200 proceeds to identify corpus operation 204. In operation 204, a corpus of electronic objects, such as a database storing emails or an Internet domain is identified. In one aspect, a conventional search engine may be employed to identify the corpus of electronic objects relevant to the query. For example, a list of top URLs generated by a search engine may constitute the corpus of electronic objects, with the electronic objects being the page represented by the URLs. In certain aspects, the corpus may be identified based upon the query. Alternatively, the corpus may be identified means without using a query, such as a specific database, a web domain, an email server, etc. In further aspects, the corpus may be identified based upon the networks and/or data stores that are accessible to the application that received the query. In further aspects, additional processing may be performed to identify the corpus. In such aspects, filtering and/or ranking may be utilized to identify a corpus of electronic objects. For example, a search engine, such as an Internet search engine, may receive a query and, based upon the query, produces a ranked list of top candidate URLs that include information to likely satisfy the query. In such an example, the top candidate URLs, as opposed to all related URLs, may be identified as the corpus of electronic objects. The query used by the search engine may be the same or similar to the query received in operation 202. That is, the search engine processes or otherwise alters the query prior to identifying the corpus of electronic objects.

Method 200 then proceeds to parse content operation 206. In one aspect, each electronic object that is part of the corpus may be parsed. In alternate aspects, only a number of highly ranked electronic objects (e.g., 5, 10, 15, 20 . . . 200, etc.) are chosen from the ranked corpus identified in operation 204. Because parsing may be computationally expensive and time consuming, it may be beneficial to only parse a set of highly ranked electronic objects in order provide a timely response to the query. Alternatively, pre-parsing of the corpus of electronic objects may be performed before receiving the query. At operation 206, the content of the electronic objects are parsed. For example, where the corpus is web pages that have been ranked ordered by a search engine, the content of each web page is parsed. Parsing may determine and delineate the content into passages. This may be a rule based system, such as delineating content into passages by identifying carriage returns in a document, the presence of a body, chapters in a video, a digital mark in an audio clip, etc. Additionally, or alternatively, content with similar semantic meaning may be grouped together as a passage.

Additionally, a semantic meaning of each passage may be determined during the parsing operation 206. The semantic meaning may be determined using a machine learned model.

Method 200 then proceeds to rank passages in each electronic object (or a subset of electronic objects identified by rank) in the corpus at operation 208. Ranking the passages of each electronic object may be performed by comparing the semantic meaning of the passage with the semantic intent of the query. Key entities of a query may be compared to entities in the passage by building a semantic translation model between the passage and the query. Alternatively, or additionally, the query answer type may be compared to the information presented in the passage. Still further, the context of the query and the passage may be compared. Further, key-features between the query and the passage may be analyzed. The result of performing one or more of these techniques on a passage is a numerical score indicating the likelihood that the passage directly answers the received query.

Method 200 then proceeds to rank aggregate passages operation 210. The method 200 may identify each ranked passage from each top candidate document. Each ranked passage may then be aggregated with the ranked passages from other electronic objects. In aspects, the aggregated passages are be ranked against one another. In aspects, ranking occurs by comparing the numerical scores of the passages, which score was determined in operation 208. Alternatively, an alternate model may be used to generate a new score for the aggregated passages.

Method 212 then proceeds to select passage operation 212. In select passage operation, the one or more top ranked passages from the ranked aggregated passages is chosen. The selected passage(s) is then returned at operation 214.

Figure 3:
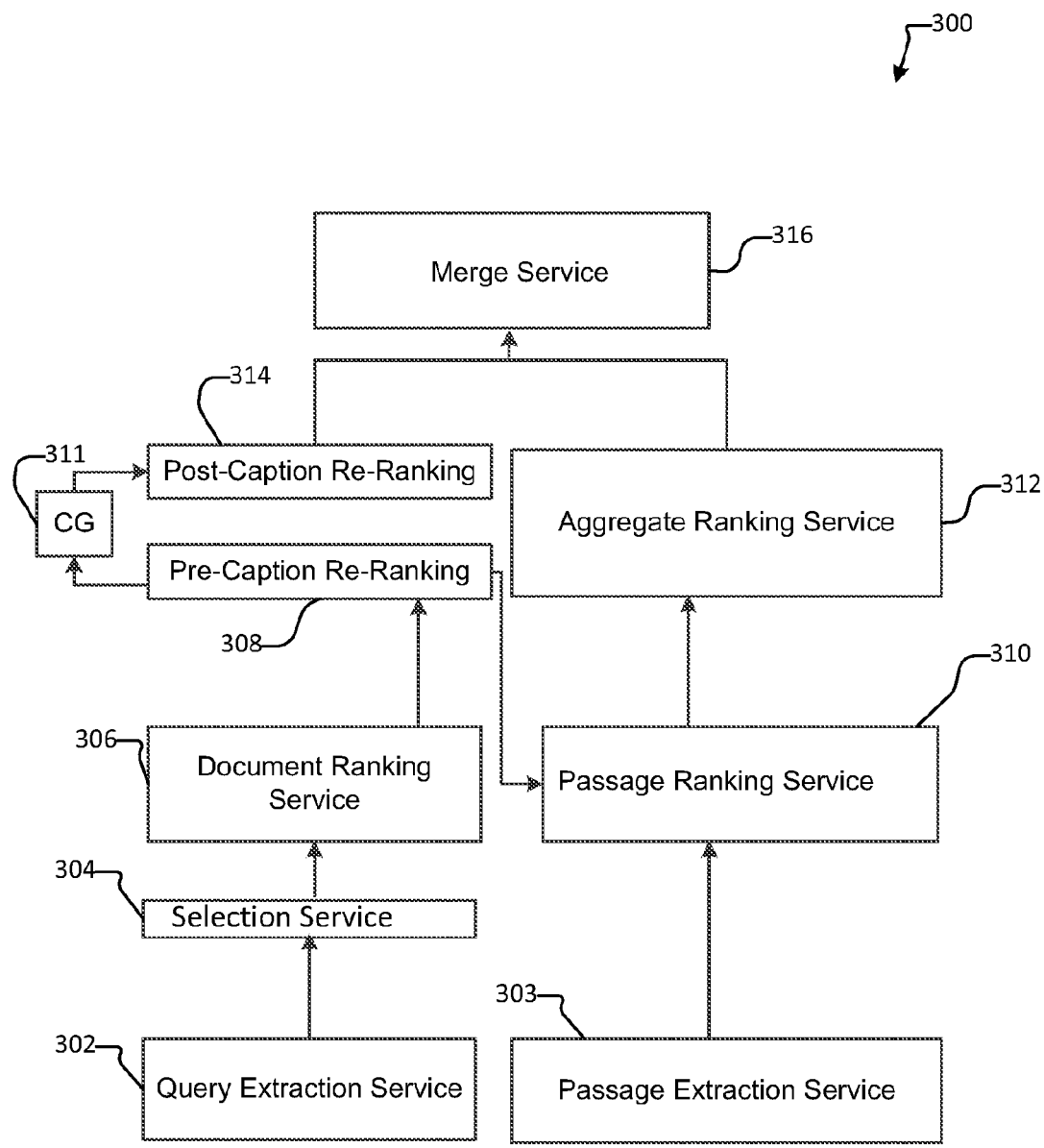
FIG. 3 illustrates an exemplary passage retrieval system for returning relevant passages based on a query.

FIG. 3 illustrates an exemplary passage retrieval system 300 for returning relevant passages based on a query. The passage retrieval system 300 may be integrated with a web search infrastructure. Passage retrieval system 300 interprets a query at interpretation service 302. In query interpretation service 302, the query may be interpreted to determine the intent of the query as well as an expected answer type. For example, user may query a system with "what drinks have the least amount of calories." The intent of the user may be identified as wanting to search the Internet to determine a list of beverages along with the number of calories associated with each beverage, rank ordered from least to highest. The intent of the query may be determined using machine learning, a deep neural network, or any other mechanism known to the art without departing form the scope of this disclosure. Query interpretation service 302 may also perform additional operations such as parsing the query, transforming the query, determine whether additional information is needed for the query, prompt the user for additional information, etc. The query, along with any interpretations, are sent to selection service 304.

At passage extraction service 303, one or more electronic objects are analyzed to determine for potential relevant passages. The extraction service may analyze a corpus of electronic documents prior to any query being received. The extraction service may analyze electronic objects by identifying signals within the object. The signals suggest whether the electronic object has content that may be useful. In embodiments, the content is parsed into individual passages. Where the passage has a signal that associated with likely relevance, the passage is flagged as potentially relevant. In aspects, the passage extraction service identifies and formulates passage candidates from electronic objects that may be relevant (or will not be relevant) prior to receiving a query (offline extraction) or after receiving a query (online extraction). The offline extraction allows for faster processing of a query, in aspects. As an example, a web domain may be searched and the content may be parsed. The content may be identified as containing mostly advertisements, or empty pages, in such an example, the web pages may be marked as not relevant. The flagged passages and/or electronic objects are sent to passage ranking service 310.

At selection service 304, candidate electronic objects are determined for further processing. Continuing with the example above, the system may identify a list of web pages that are sorted by relevant keyword calorie, drink, beverage, etc. Other methods of identifying relevant webpages in the URL may be used. The resulting corpus of electronic documents is sent to the document ranking service 306. The returned electronic objects may then be ranked by keyword or semantic relevance at document ranking service 306.

The top-most candidates determined at document ranking service 306 are passed to pre-caption ranking service 308. Pre-caption ranking service 308 further determines a relevance of the electronic objects. A numerical score, such as a probability, may be associated with each candidate document in order to determine relevance. The result of pre-caption ranking service 308 is a list of pre-caption ranked electronic objects (such as URLs linking relevant web pages). The results of pre-caption ranking service 308 are passed to both caption generator 311 and passage ranking service 310.

At passage ranking service 310, individual passages of each of the results of pre-caption ranking service 308 are ranked. The identification of passages is performed with passage extraction service 303. To continue with the above example, the pre-caption ranking service may have returned a list of 10 URLs that are relevant to the intent of the user. Each passage within the electronic objects identified by each URL is ranked. The different electronic objects identified by the different URLs may contain a varying number of passages. That is, the electronic object identified by URL 1 (hereinafter referred to as "URL 1") may have 3 passages, the electronic object identified by URL 2 (hereinafter referred to as "URL 2") may have 7 passages, etc. The passages within each identified electronic object may be ranked against one another. As an example, the URL 1 will be ranked against the other passages of URL 1, the passages in URL 2 will be ranked against other passages in URL 2, and so on Ranking may be performed using keywords, relevance to the user intent, etc.

The passage ranking service 310 identifies and ranks passages from the electronic objects included in the pre-caption results. Ranking the passages of each page may be performed by comparing the semantic meaning of the passage with the semantic intent of query. Key entities of a query may be compared to entities in the passage by building a semantic translation model between the passage and the query. Also, the query answer type may be compared to the information presented in the passage. Further, the context of the query and the passage may be compared. Additionally, cross-document aggregation may be used. Further, key-features between the query and the passage may be analyzed. In aspects of the technology, the result of performing one or more of these techniques on a passage is a numerical score indicating the likelihood that the passage directly answers the received query.

The n-top ranked passages of each electronic object ranked at pre-caption ranking service 310 is passed to aggregate rank service 312. At aggregate rank service 312, all of the ranked passages are ranked against each other. For example, each of the top three passages from URL 1 may be received, the top three passages from URL 2 may be received, and the top three passages from URL 3 may be received for a total of 9 URLs. These top passages, known as the aggregated passages, are then ranked against each other. Ranking may occur using the numerical scores assigned to each passage at service. Additionally, or alternatively, the numerical scores of each passage may be recalculated. The resulting top n-most passage is passed to merge service 312.

Returning to caption generator 311, caption generator generates one caption for each of the pre-caption ranked electronic objects resulting from the pre-caption ranking service 308. The caption generator parses the content of each pre-caption ranked electronic object (or portion thereof) and generates a caption. The caption may be generated using a machine learned model. The caption is applied the electronic objects and to form a captioned electronic objects. The captioned electronic objects are then sent to the post-caption ranking service 314.

The post-caption re-ranking service 314 re-ranks the ranked electronic objects received by the caption generator 311. The re-ranking includes an analysis of the summary generated in caption generator 311. The analysis may be performed by a machine learned model. This results in post-caption re-ranked electronic objects. The results are sent to merge service 316.

In aspects, at merge service 316, the top n-most passage(s) are formatted for presentation along with one or more links to post-caption re-ranked electronic objects. For example, the top most passage from an electronic object (such as a web page) may be formatted in such a way so as to display in a mobile device, and a link to the top post-caption re-ranked electronic objects may be included.

Figure 4:
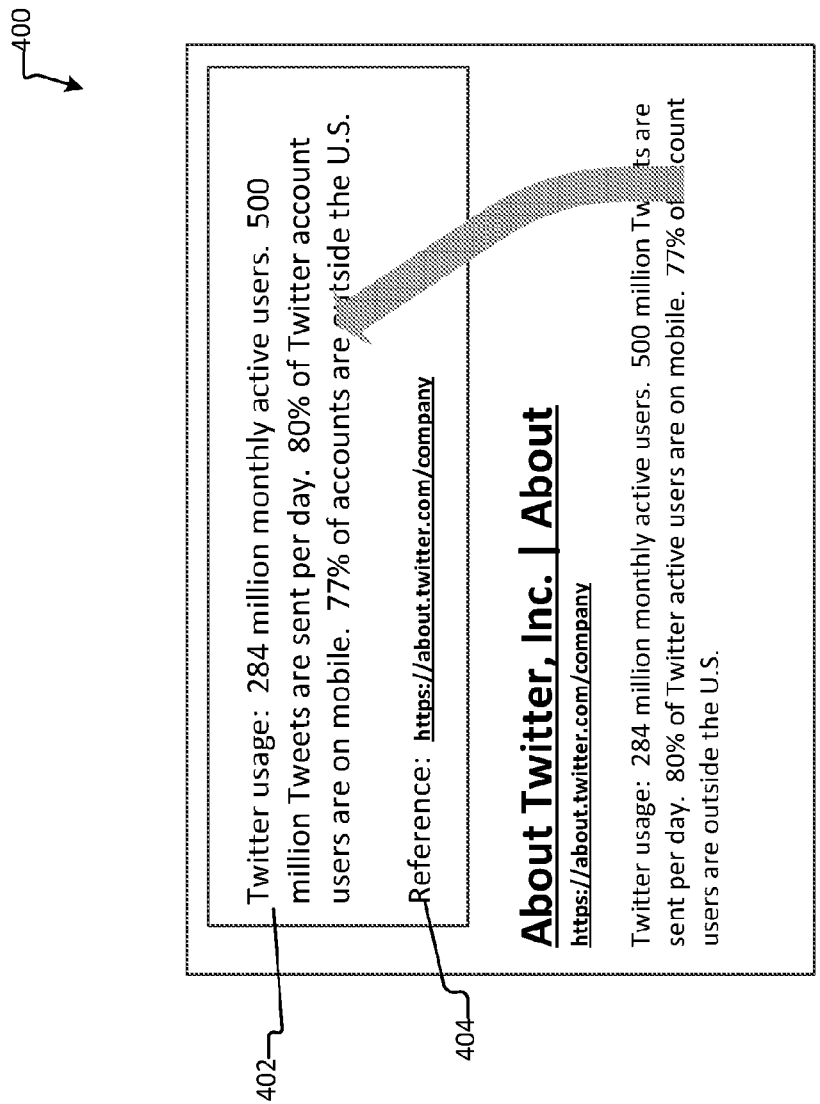
FIG. 4 illustrates an example output of a relevant passage and a link to an exemplar electronic object.

FIG. 4 illustrates an example output of a relevant passage and a link to an exemplar electronic object. As illustrated example output 400 includes a passage 402 and a link 404.

The passage 402 is a passage that answers a query, such as a user entering a query into a browser, based on the interpretation of the intent of the query. The summary may be an actual passage from one or more top electronic objects, such as the web paged linked by link 404, or may be generated using an amalgamation of various top-ranked electronic objects.

The link 404 shown in example output 400 is a URL, though it need not be. In some embodiments, multiple links are provided. The multiple links may be the top-n most relevant links as determined by the systems and methods described herein.

Figure 5:
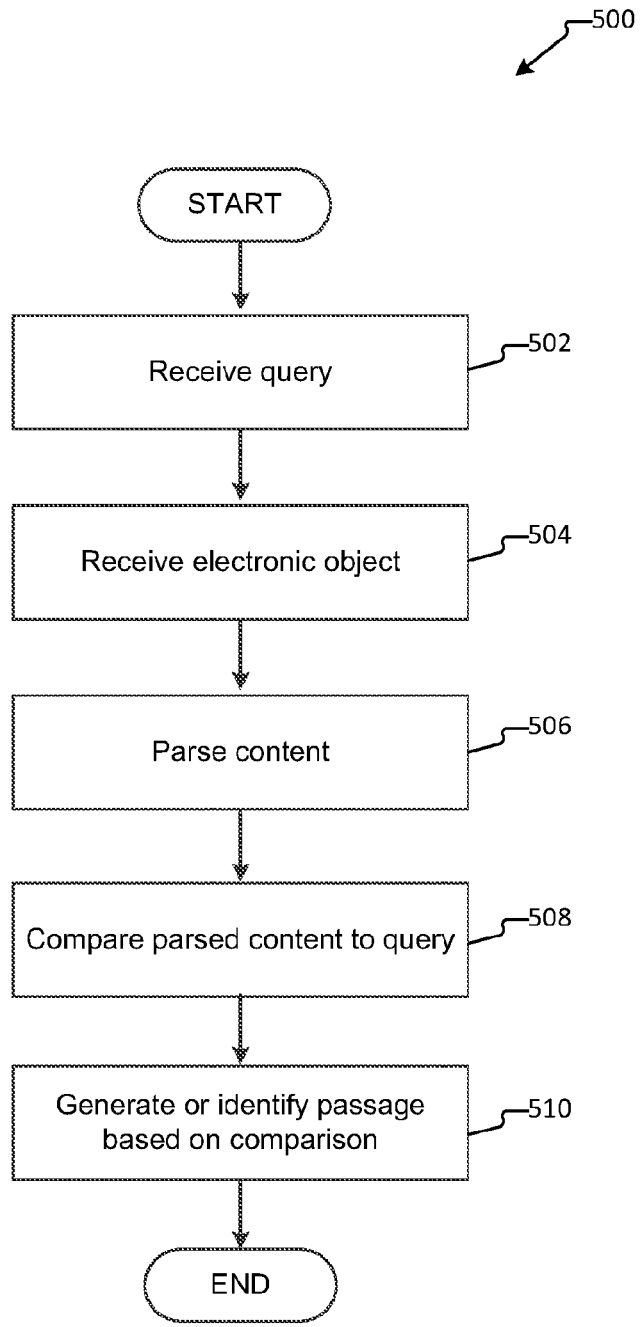
FIG. 5 illustrates an exemplary a method for identifying a query dependent passage.

FIG. 5 illustrates a method 500 for identifying a query dependent passage. In aspects, method 500 may be implemented to fine relevant passages based on comparing a passage to the query. In examples, method 500 may be executed on a device comprising at least one processor configured to store and execute operations, programs or instructions. However, method 500 is not limited to such examples. In other examples, method 500 may be performed on an application or service for providing the storage and/or manipulation of user input. In at least one example, method 500 may be executed (e.g., computer-implemented operations) by one or more components of a distributed network, such as a web service/distributed network service (e.g. cloud service).

Method 500 begins with receive query operation 502. In receive query operation 502, a query is received. The query may be received from a client device, such as a client device 102. The query may be a natural language query entered into a web browser. The query is then parsed to determine information about the query. For example, the semantic meaning of the query may be determined, keywords and entities may be identified, and answer type may be determined. This may be performed using a machine learned model.

Method 500 then proceeds to receive electronic object operation 504. In operation 504, a list of electronic objects (such as web pages, emails, word documents) is received based on the received query. For example, where the query is an Internet search query entered into a browser, a search engine will run a search using the query. In such a case, a list of links will be received.

Method 500 then proceeds to parse electronic object operation 506. In operation, the content of the electronic object is parsed. The parsing may be done by extracting the content (textual, audio, video, etc.) of the electronic object, such as a web page, email, or word processing documents. The parsing may be done using a machine learned model. Parsing may identify passages in the content, such as paragraphs or sentences in an electronic object that have similar semantic meaning. From such parsing, the semantic meaning of the passages within the electronic object, is identified.

The semantic meaning and other information derived at operation 506 may be compared to information related to the query at the compare operation 508. For example, the keywords, entities, answer type derived from in operation 502 may be compared to the information derived at operation 506. The comparison may identify passages that are highly relevant to the query. Each passage may be ranked according to relevance of the passage.

The method 500 then proceeds to identify passage based on comparison operation 510. In aspects, the top n-most passages are identified as highly relevant. Relevancy may be determined in a variety of ways. For example, key entities of a query may be compared to entities in the passage by building a semantic translation model between the passage and the query. Also, the query answer type may be compared to the information presented in the passage. Further, the context of the query and the passage may be compared. Additionally, cross-document aggregation may be used. Further, key-features between the query and the passage may be analyzed. In aspects of the technology, the result of performing one or more of these techniques on a passage is a numerical score indicating the likelihood that the passage directly answers the received query.

One or more highly relevant passages may be identified in identify operation 510. Identifying may be performed by choosing the top most relevant passage. The passages may have been assigned a numerical score. In such cases, identification may be any passage that exceeds a threshold numerical value.

Figure 6:
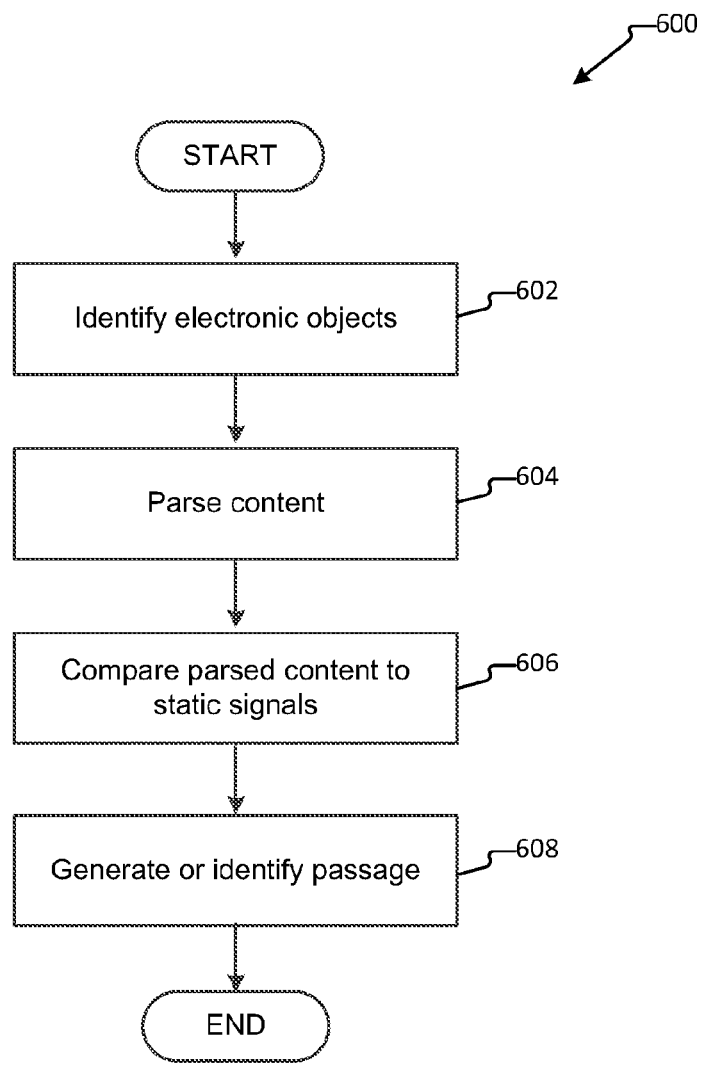
FIG. 6 illustrates a method for identifying a query independent passage in a document.

FIG. 6 illustrates a method 600 for identifying a query independent passage in a document. In aspects, method 600 may be used to identify passages as potentially relevant irrespective of any query. That is, no query is necessarily used to determine potential relevance. In examples, method 600 may be executed on a device comprising at least one processor configured to store and execute operations, programs or instructions. However, method 600 is not limited to such examples. In other examples, method 600 may be performed on an application or service for providing the storage and/or manipulation of user input. In at least one example, method 600 may be executed (e.g., computer-implemented operations) by one or more components of a distributed network, such as a web service/distributed network service (e.g. cloud service).

Method 600 begins with identify electronic objects operation 602. At operation 602, various electronic objects may be identified. Identification may be based on a set list (such as all web pages in a popular URL, all emails from a particular user, all documents created on or before a certain date).

Method 600 then proceeds with parse content operation 604. In parse content operation, the electronic objects are parsed to determine the attributes of the electronic object. Parsing may include identifying metadata for the corpus of electronic objects. In other aspects, the content may be parsed. For example, where the electronic object is a web page, it may be determined that the URL does not include any discernable information, is mostly dedicated to advertisements, or is associated with a domain.

Method 600 then proceeds to compare parsed content to static signal operation 606. Static signals may include a variety of signals. For example, where the electronic object is a document, the static signal may be a threshold length of the document, a threshold number of grammatical errors in a document, a list of trusted/untrusted authors, etc. Where the electronic object is a URL, the static signal may be untrusted/trusted URLs, the number of pop-ups, the presence of a paywall, etc. Electronic objects or passages within the electronic object may be flagged or ranked as useful/not useful based on the presence or absence of a static signal.

Method 600 then proceeds to generate or identify passage 608. In aspects, passages of the electronic object that are flagged as not useful may be excluded. Where the static signal highlights highly relevant passages, those passages may be identified as useful and flagged as much.

Figure 7:
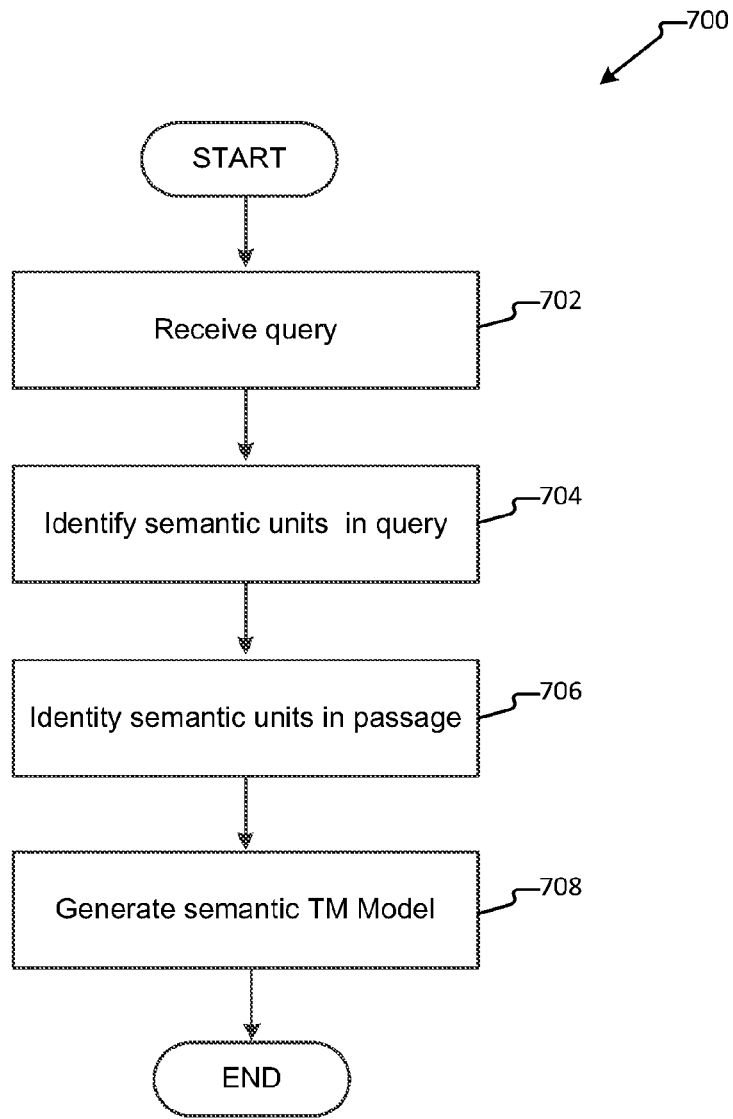
FIG. 7 illustrates an exemplary method for ranking a passage based on a semantic translation model.

FIG. 7 illustrates a method 700 for ranking a passage based on a semantic translation model. In examples, method 700 may be executed on a device comprising at least one processor configured to store and execute operations, programs or instructions. However, method 700 is not limited to such examples. In other examples, method 700 may be performed on an application or service for providing the storage and/or manipulation of user input. In at least one example, method 700 may be executed (e.g., computer-implemented operations) by one or more components of a distributed network, such as a web service/distributed network service (e.g. cloud service).

Method 700 begins with receive query 702. In receive query operation 702, a query is received. The query may be received from a client device and sent to a server for processing, such as a client device 102. The query may be a natural language query entered into a web browser.

Method 700 then proceeds to identify semantic units in a query operation 704. Semantic units in the query operation may be identified using a machine learned model. For example, for the query "Will a California king fit on a king frame?" the entities in query may be identified as {California_king} and {king_frame}.

The method 700 then proceeds to identify semantic units in a passage 706. The semantic units of a passage may be identified using a machine learned model. Following the above example, a passage may be: "Insta-lock Queen, King, Cal-king Bedframe It's a bed frame We purchased this bed frame for a mattress & box springs. The instructions were easy to read & the frame went together without any problems." Another passage may be "A California king bed measures 72 inches wide and 84 inches long, and a standard king mattress measures 76 inches wide and 80 inches long, so while a California king mattress is four inches longer, it is also about four inches thinner than a standard king bed." Each passage is parsed to identify entities.

Method 708 then proceeds to generate semantic translation model "TM" 708. In operation 708 a TM model is generated by building a semantic unit relationship table with translation probabilities between the query and the passage. The entity relationship table, in aspects, generates a probability that the entity identified in the query is present in the passage.

FIG. 8 illustrates experimental output resulting from identifying features of a passage based on a query and a sample target electronic object. The semantic translation model is generated with machine learning method. As illustrated, column one 802 includes semantic units of source query, column two 804 includes target passage semantic units, column three 806, is the probability that the semantic unit in the passage is the same as the entity used in the query, and column 4 808 is the probability that the semantic unit in the query is the same as the semantic unit in the passage. The higher the probability the most likely the source will match the target. Note that P(target source) normally is not the same as P(source target).

As illustrated, column one 802 includes a semantic unit of source query, column two 804 includes target passage semantic unit, column three 806, is the probability that the semantic unit in the passage is the same as the semantic unit used in the query, and column 4 808 is the probability that the semantic unit in the query is the same as the semantic unit in the passage.

Figures 9, 10:
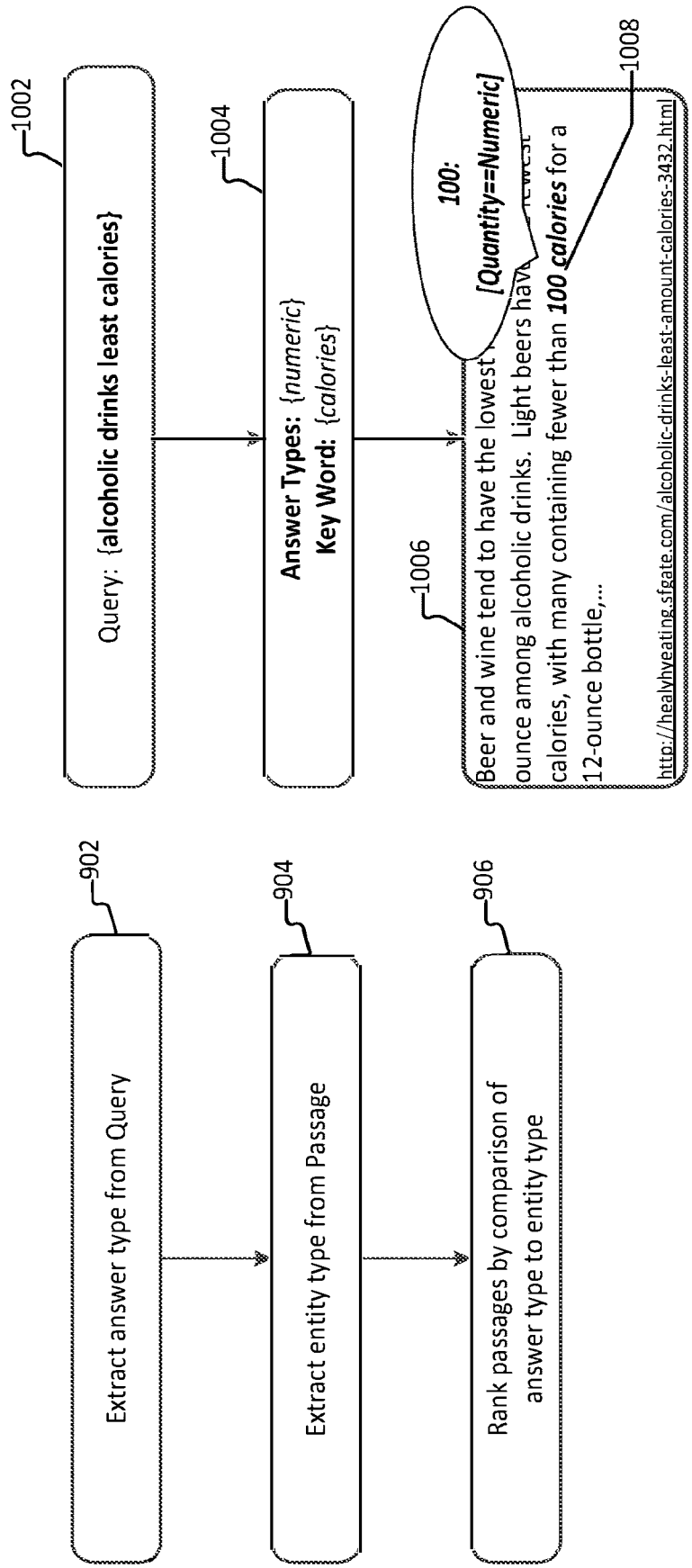
FIG. 9 illustrates an exemplary method of matching a passage type to a query type.
FIG. 10 illustrates an example output generated using a method for matching a passage type to a query type.

FIG. 9 is a method 900 of matching a passage type to a query type. In examples, method 900 may be executed on a device comprising at least one processor configured to store and execute operations, programs or instructions. However, method 900 is not limited to such examples. In other examples, method 900 may be performed on an application or service for providing the storage and/or manipulation of user input. In at least one example, method 900 may be executed (e.g., computer-implemented operations) by one or more components of a distributed network, such as a web service/distributed network service (e.g. cloud service).

Method 900 beings with extract answer type from query operation 902. In aspects, a query type of the answer may be numerical, a location, a time, a commercial center, etc. For example, a query may ask "how many teaspoons in a cup." In such an instance, the answer to a query type would be numerical. Additionally, a query may be "where can I buy sushi grade fish near me." In such a case, the answer type would be a commercial center, such as a fish store. In aspects, a query is parsed using a machine learned model to determine the answer-type of the query.

The method 900 then proceeds to extract entity type from passage 904. An entity type may be identified an extracted using a machine learned model. The entity type may be one that is numerical, a location, a time, a commercial center, etc. For example, if the passage includes the phrase "There are 48 teaspoons in a cup," the entity 48 would be identified as numerical. Another passage may include the phrase "teaspoon sizes originated in England, where the price of tea caused tea cups and spoons to shrink." The entity England would be identified as a location. An entity may have multiple entity types. For example, consider the following text from a passage: "Von Miller was the MVP of Super Bowl 50." The following types may be associated with Von Miller: Person, Athlete, American Football Player.

The method 900 then proceeds to rank passages 906. In rank passage operation 906, the passages are ranked by comparing the answer type to the entity type identified in operation 904. Following the example above, if the query is expected to return a numerical answer (e.g., "how many teaspoons in a cup") passages with a numerical entity (e.g., "there are 48 teaspoons in a cup") would be flagged as relevant. Other passages where the entity did not match the answer type (e.g., "teaspoon sizes originated in England, where the price of tea caused tea cups and spoons to shrink") would be flagged as likely not relevant. In aspects, the ranking of the passages is based on a machine learned model.

FIG. 10 is an example output using a method of matching a passage type to a query type. As illustrated, a query 1002 "what are the drinks with the' least amount of calories" has been parsed to identify a semantic intent 1004 "alcoholic drinks with least calories." FIG. 10 also includes the resolution of the answer type 1006 sought by the query 1002 as numeric and has identified key words as "calories." Identification of semantic intent, answer types, and keywords may be performed by using a machine learned model.

FIG. 10 also includes a passage 1008 that has been parsed. In aspects, the passage is parsed using a machine learned model. As illustrated, the parsed passage includes identified entities "calories" that is the same as the key words identified in the query. Further, the calories include a modifier "100," which matches up with the query answer type numeric. Accordingly, the passage will be given a relatively high score. In aspects, the score is calculated by adding the number of like elements of a passage (e.g., like answer types/entities, and keywords) of a passage. Scores may be calculated other ways.

FIG. 11 is a method 1100 of matching an electronic object to a query based on contextual meaning. In examples, method 1100 may be executed on a device comprising at least one processor configured to store and execute operations, programs or instructions. However, method 1100 is not limited to such examples. In other examples, method 1100 may be performed on an application or service for providing the storage and/or manipulation of user input. In at least one example, method 1100 may be executed (e.g., computer-implemented operations) by one or more components of a distributed network, such as a web service/distributed network service (e.g. cloud service).

Method 1100 begins with extract nearest heading to passage as at operation 1102. It will be appreciated that heading may refer to any marker in an electronic object that that indicates a section of the electronic object. This may include title, caption, legend, subtitle, subheading, rubric, headline, etc. In operation 1102, the nearest heading to a passage may be extracted. This may be done by identifying tagged content in an electronic object (such as a web page that identifies a phrase as a heading), the title of a video, the subject line of an email, etc. Identification may be performed using a machine learned model.

Method 1100 then proceeds to identify semantic meaning of query 1104. The semantic meaning of a query may be identified using a machine learned model.

Method 1100 then proceeds to compare heading to query operation 1106. In operation 1104, the contextual meaning of each heading is compared to the semantic meaning of the query. Where the heading is similar to the query, the heading is marked as relevant.

Method 1100 then proceeds to flag passage operation 1108. At operation 1104, passages associated with a heading that has been marked as relevant are flagged as likely relevant. In some embodiments, a numerical score associated with the relevance of the passage is increased based on a flagged header.

FIG. 12 is an example of matching an electronic object to a query based on the heading of the electronic object. As illustrated, the query 1202 includes "how to change the excel cell width." The headings of a web page (an example electronic object) are analyzed to determine potentially relevant passages. The heading and query may be analyzed using the methods described herein, including method 1100. In this example, the title of the heading of the web page 1204 is "Changing Column Widths and Row Heights in Excel." Further sub-headings within the web page are analyzed. In this case, the sub heading "how to change column widths" 1206 and sub-heading "how to change row heights" 1208 are analyzed. The passage 1208 associated with the sub-heading "how to change column widths" 1206 is flagged as potentially relevant. This relevant passage 1210 may then be processed further, given a numerical score, or have the numerical score increased.

Figures 13, 14:
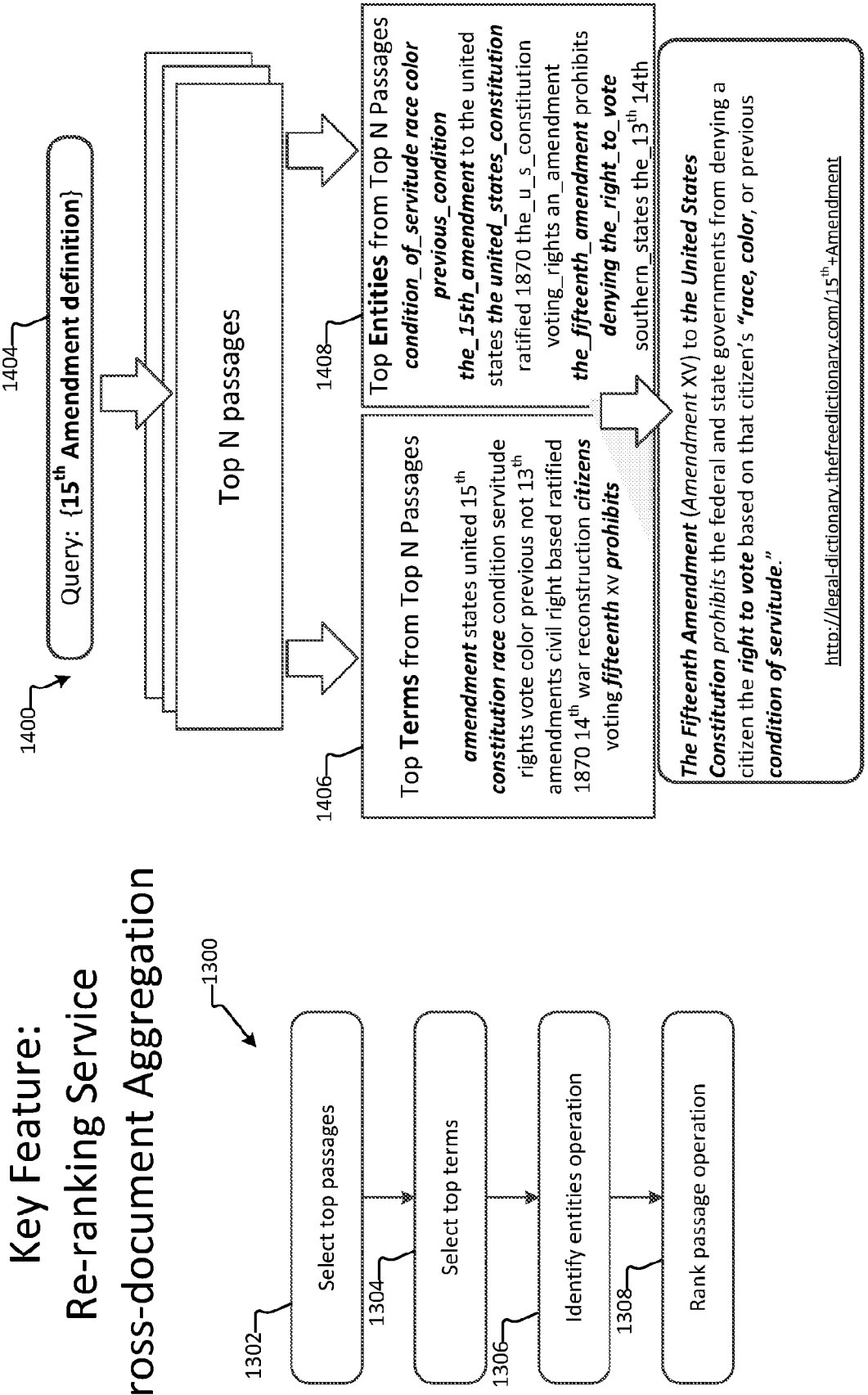
FIG. 13 illustrates an exemplary method of aggregation model of ranking passages.
FIG. 14 is an example of applying the aggregation method on the passage.

FIG. 13 is a method 1300 of ranking passages. Method 1302 begins with select top passages. In operation 1300, top candidate passages are identified.

The method 1300 then proceeds select top terms operation 1304. From each passage 1302. In operation 1304, the terms that are the same or similar to terms of query are identified in each passage. Identification of top terms may be done by using a machine learned model.

The method 1300 then proceeds to identify entities operation 1306. In operation 1306 entities that are similar to or the same as those of the query (or related to those of the query) of the passage are identified. Same, similar, or related entities may be determined using a machine learned model.

The operation then proceeds to rank operation 1308. In operation 1308, each passage is ranked. In an aspect, the passage is ranked summing the number of keywords and entities identified in operation 1306 and 1304. The passage with the highest total may be ranked first, in aspects.

FIG. 14 is an example 1400 of applying the method 1300 on the passage "The Fifteenth Amendment (Amendment XV) to the United States Constitution prohibits the federal and state governments from denying a citizen the right to vote based on that citizen's "race, color, or previous condition of servitude" 1402. As illustrated, the query 1404 is "$15^{th}$ amendment definition." In top terms identification 1406, the top terms, such as the term "amendment", "constitution", "citizens", "fifteenth", and "prohibits" are identified. This is five terms.

The example 1400 also includes identifying similar, same, or related top entities. In the example, the entities "condition_of_servitude," "previous_condition," "the_15th_amendment_to_the_united_states_the_united_ states_constitution," "the_u_s_constitution voting_rights an_amendment the_fifteenth_amendment" "the_right_to_vote southern_states the_$13^{th}$" are identified. This is a total of 5 entities. In embodiments, the passage would be given a rank of 10.

FIG. 15 illustrates a method 1500 of matching answer patterns in passages to answer types related to queries. Method 1500 begins with determine query answer pattern operation 1502. A query answer pattern is determined based on the query pattern. A query may be in a pattern such as who is noun, where is noun, etc. Using a machine learned model, a translation table between the query pattern and the pattern of the expected answer, e.g., the query answer pattern, may be established.

Method 1500 then proceeds to determine passage pattern operation 1504. In determine passage pattern operation 1504, the pattern of passage is determined. The semantic pattern of the passage may be determined using a machine learned model.

Method 1500 proceeds to compare passage pattern with query answer pattern operation 1506. In this example, the patterns of the passage are identified that have a similar or same pattern as the query answer pattern.

Method 1500 proceeds to score passage operation 1508. Based on the similarity, the passage is scored and/or moved to a higher rank. Various different probabilistic models may be employed to score the passage based upon the similarity.

FIG. 16 is an example 1600 of the results of performing method 1500 on a passage.

As illustrated, the query 1602 the query is "who was the king of England after Queen Elizabeth 1." In this example, the query answer pattern is passages with answer pattern 1608 "<answer> was king of king <answer>, who father, <answer>."

Top answer 1610 is discovered by analyzing the top N passages 1606. In this example, the answer includes the entities "the virgin queen anne_boleyn the daughter king_henry_viii," "when_she queen_elizabeth_i prince_james," "james_vi_of_scotland," and "44_years_of rule."

The most relevant passage 1612 associated with the answer is "After the death of Queen Elizabeth I without issue, in 1603, the crowns of England and Scotland were joined in personal union under King James VI of Scotland, who became James I of England." This may be provided to a user as a direct answer to the query.

Figure 17:
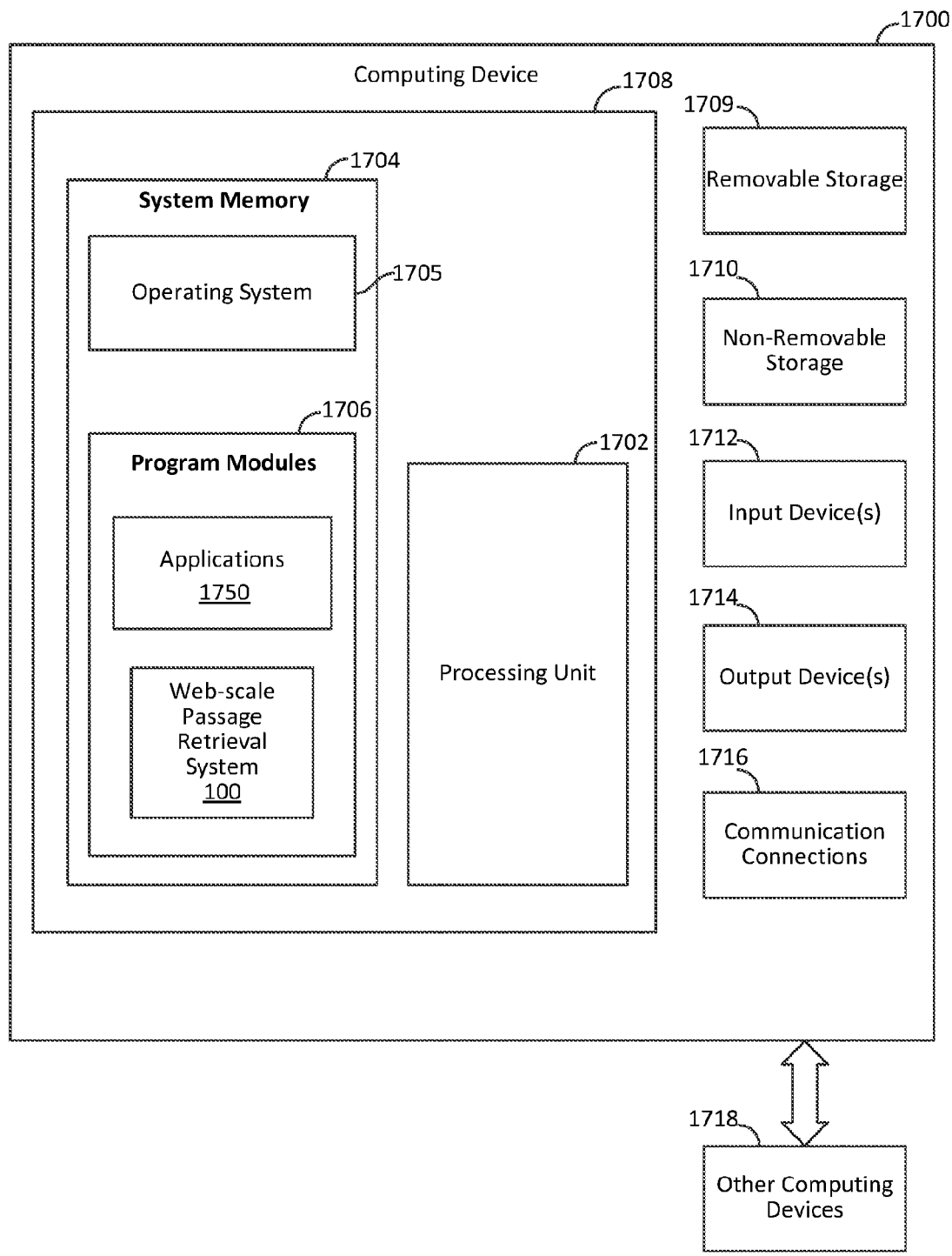
FIG. 17 is a block diagram illustrating example physical components of a computing device with which aspects of the disclosure may be practiced.
Figure 18A:
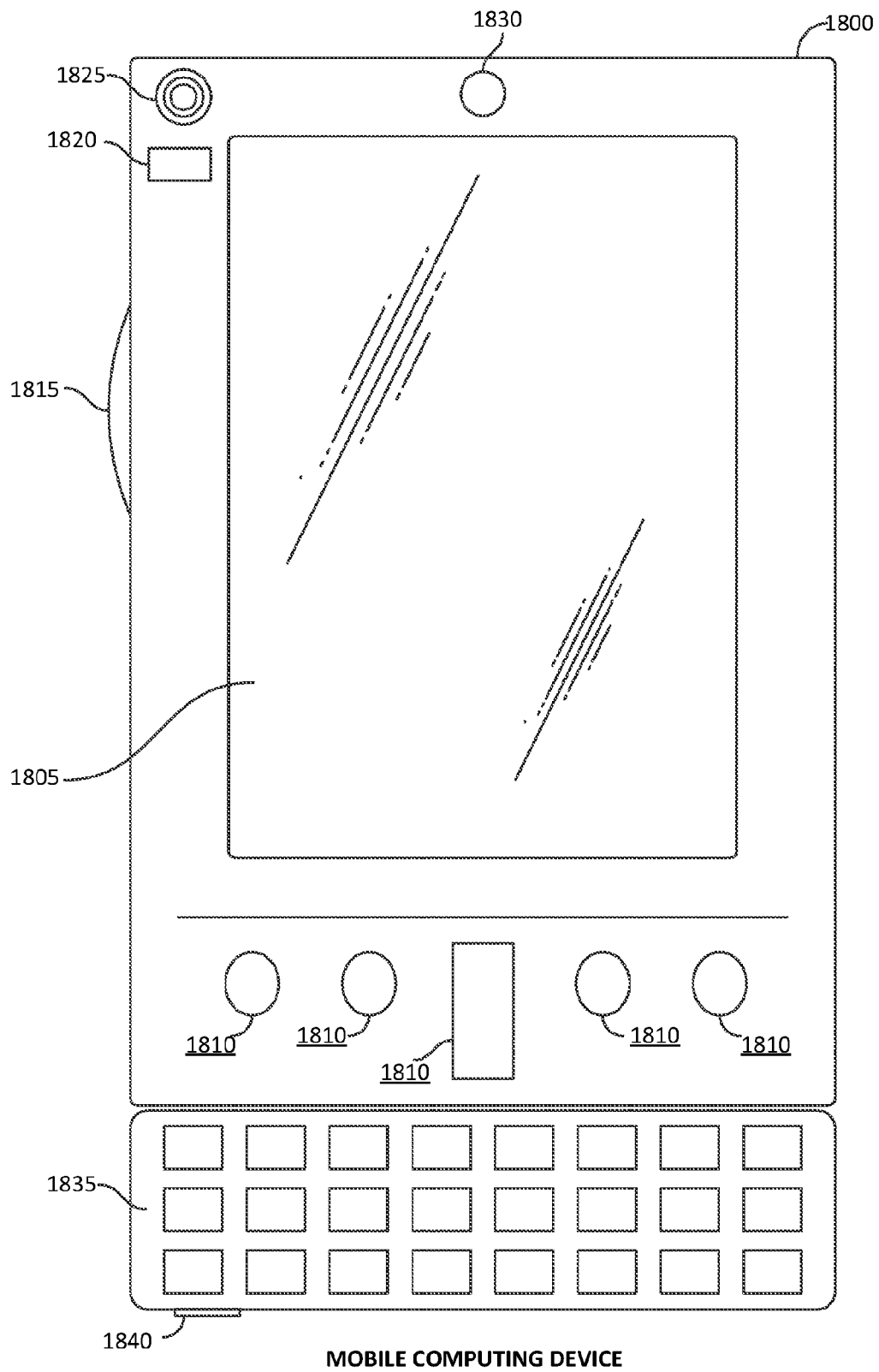
FIGS. 18A and 18B are simplified block diagrams of a mobile computing device with which aspects of the present disclosure may be practiced.
Figure 18B:
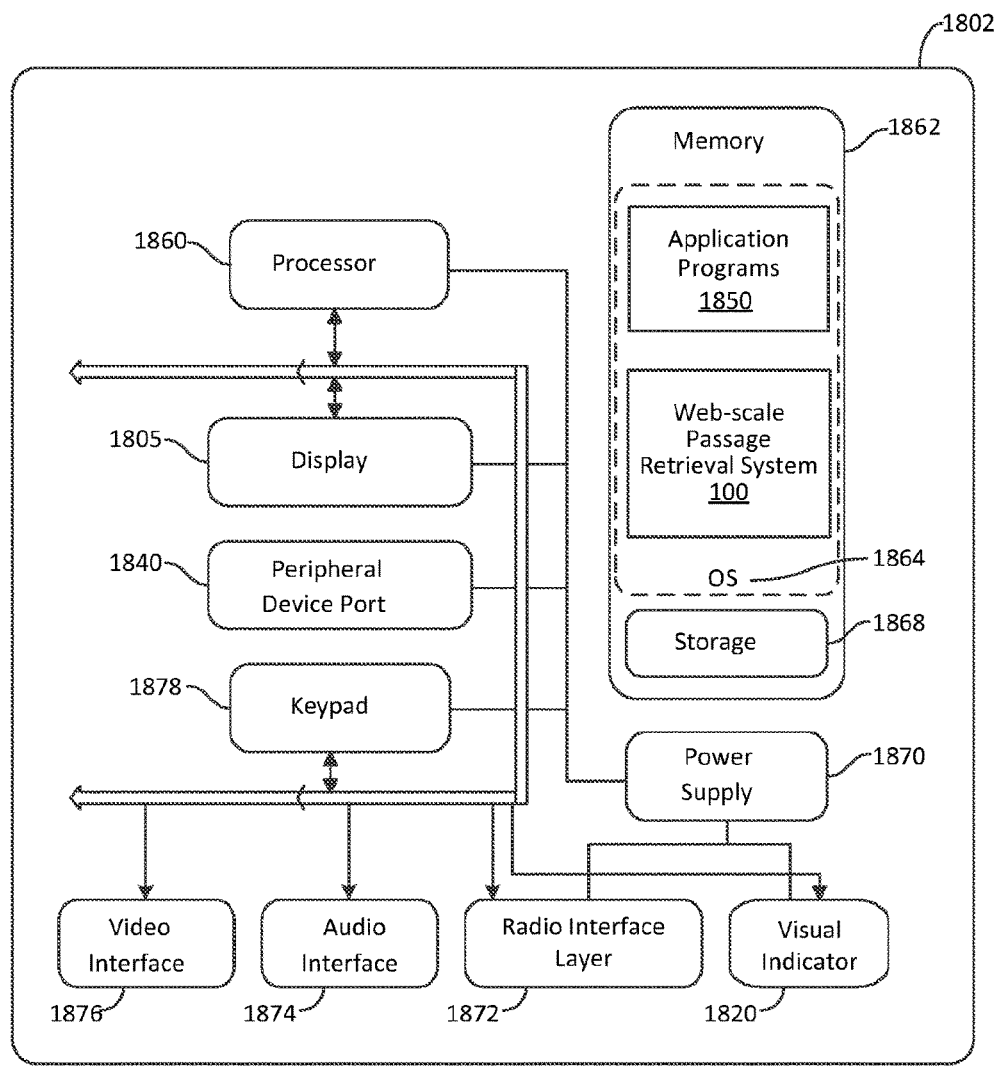
Figure 19:
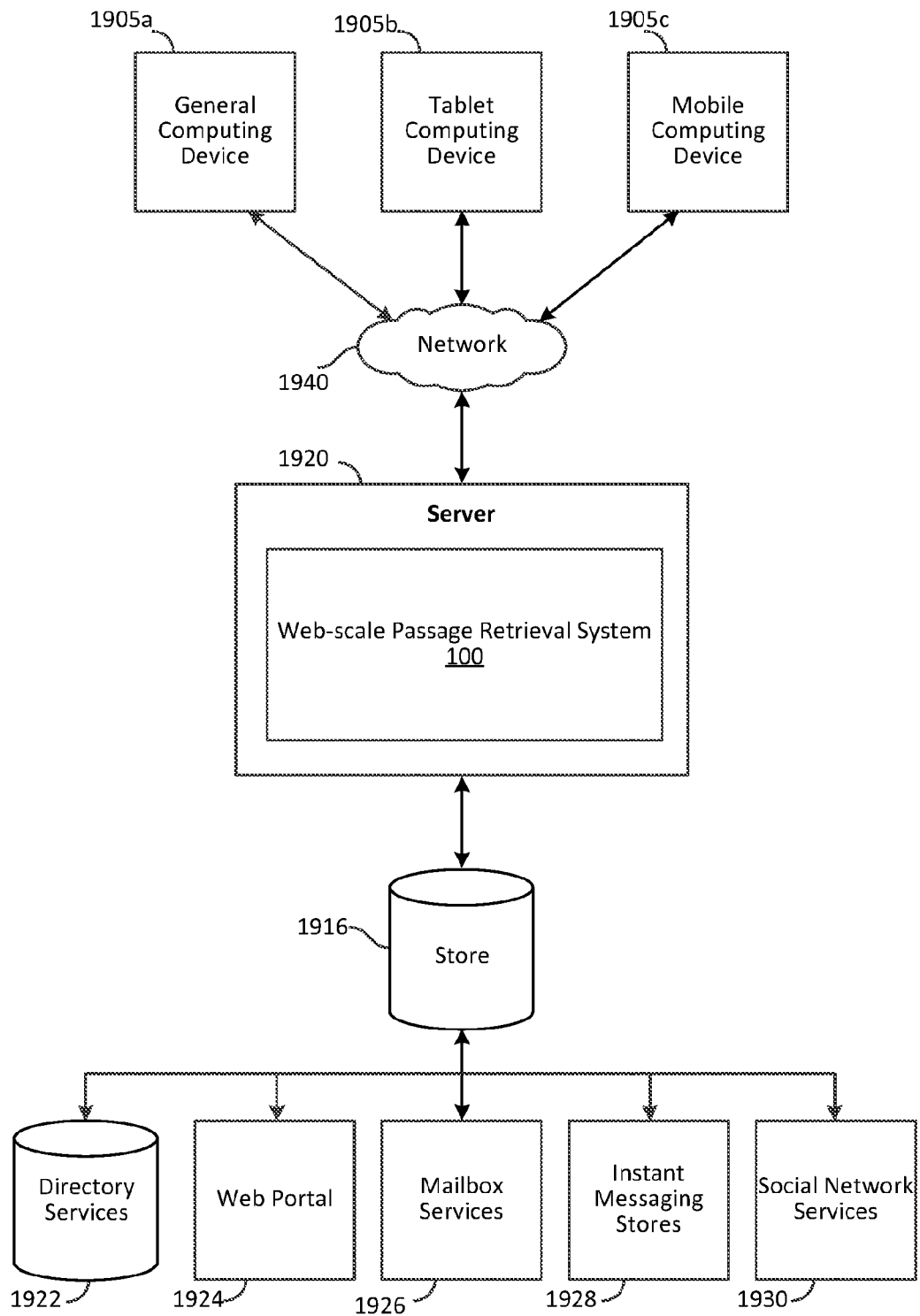
FIG. 19 illustrates one example of the architecture of a system for web-scale passage retrieval as described above.

FIGS. 17-19 and the associated descriptions provide a discussion of a variety of operating environments in which examples are practiced. However, the devices and systems illustrated and discussed with respect to 17-19 are for purposes of example and illustration and are not limiting of a vast number of computing device configurations that are utilized for practicing aspects, described herein.

FIG. 17 is a block diagram illustrating physical components (i.e., hardware) of a computing device 1700 with which examples of the present disclosure may be practiced. In a basic configuration, the computing device 1700 includes at least one processing unit 1702 and a system memory 1704. According to an aspect, depending on the configuration and type of computing device, the system memory 1704 comprises, but is not limited to, volatile storage (e.g., random access memory), non-volatile storage (e.g., read-only memory), flash memory, or any combination of such memories. According to an aspect, the system memory 1704 includes an operating system 1705 and one or more program modules 1706 suitable for running software applications 1750. According to an aspect, the system memory 1704 includes the system 100. The operating system 1705, for example, is suitable for controlling the operation of the computing device 1700. Furthermore, aspects are practiced in conjunction with a graphics library, other operating systems, or any other application program, and are not limited to any particular application or system. This basic configuration is illustrated in FIG. 17 by those components within a dashed line 1708. According to an aspect, the computing device 1700 has additional features or functionality. For example, according to an aspect, the computing device 1700 includes additional data storage devices (removable and/or non-removable) such as, for example, magnetic disks, optical disks, or tape. Such additional storage is illustrated in FIG. 17 by a removable storage device 1709 and a non-removable storage device 1710.

As stated above, according to an aspect, a number of program modules and data files are stored in the system memory 1704. While executing on the processing unit 1702, the program engines 1706 (e.g., the engines of system 1700) perform processes including, but not limited to, one or more of the stages of the methods used for aggregating and modeling illustrated in FIGS. 2,3, 5, 6, 7, 9, 11, 13, and 15. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 17 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1700 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 1700 has one or more input device(s) 1712 such as a keyboard, a mouse, a pen, a sound input device, a touch input device, etc. The output device(s) 1714 such as a display, speakers, a printer, etc. are also included according to an aspect. The aforementioned devices are examples and others may be used. According to an aspect, the computing device 1700 includes one or more communication connections 1716 allowing communications with other computing devices 1718. Examples of suitable communication connections 1716 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 1704, the removable storage device 1709, and the non-removable storage device 1710 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1700. According to an aspect, any such computer storage media is part of the computing device 1700. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 18A and 18B illustrate a mobile computing device 1800, for example, a mobile telephone, a smart phone, a tablet personal computer, a laptop computer, and the like, with which aspects may be practiced. With reference to FIG. 18A, an example of a mobile computing device 1800 for implementing the aspects is illustrated. In a basic configuration, the mobile computing device 1800 is a handheld computer having both input elements and output elements. The mobile computing device 1800 typically includes a display 1805 and one or more input buttons 1810 that allow the user to enter information into the mobile computing device 1800. According to an aspect, the display 1805 of the mobile computing device 1800 functions as an input device (e.g., a touch screen display). If included, an optional side input element 1815 allows further user input. According to an aspect, the side input element 1815 is a rotary switch, a button, or any other type of manual input element. In alternative examples, mobile computing device 1800 incorporates more or fewer input elements. For example, the display 1805 may not be a touch screen in some examples. In alternative examples, the mobile computing device 1800 is a portable phone system, such as a cellular phone. According to an aspect, the mobile computing device 1800 includes an optional keypad 1835. According to an aspect, the optional keypad 1835 is a physical keypad. According to another aspect, the optional keypad 1835 is a "soft" keypad generated on the touch screen display. In various aspects, the output elements include the display 1805 for showing a graphical user interface (GUI), a visual indicator 1820 (e.g., a light emitting diode), and/or an audio transducer 1825 (e.g., a speaker). In some examples, the mobile computing device 1800 incorporates a vibration transducer for providing the user with tactile feedback. In yet another example, the mobile computing device 1800 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1800 incorporates peripheral device port 1840, such as an audio input (e.g., a microphone jack), an audio output (e.g., a headphone jack), and a video output (e.g., a HDMI port) for sending signals to or receiving signals from an external device.

FIG. 18B is a block diagram illustrating the architecture of one example of a mobile computing device. That is, the mobile computing device 1800 incorporates a system (i.e., an architecture) 1802 to implement some examples. In one example, the system 1802 is implemented as a "smart phone" capable of running one or more applications (e.g., browser, e-mail, calendaring, contact managers, messaging clients, games, and media clients/players). In some examples, the system 1802 is integrated as a computing device, such as an integrated personal digital assistant (PDA) and wireless phone.

According to an aspect, one or more application programs 1850 are loaded into the memory 1862 and run on or in association with the operating system 1864. Examples of the application programs include phone dialer programs, e-mail programs, personal information management (PIM) programs, word processing programs, spreadsheet programs, Internet browser programs, messaging programs, and so forth. According to an aspect, system 100 is loaded into memory 1862. The system 1802 also includes a non-volatile storage area 1868 within the memory 1862. The non-volatile storage area 1868 is used to store persistent information that should not be lost if the system 1802 is powered down. The application programs 1850 may use and store information in the non-volatile storage area 1868, such as e-mail or other messages used by an e-mail application, and the like. A synchronization application (not shown) also resides on the system 1802 and is programmed to interact with a corresponding synchronization application resident on a host computer to keep the information stored in the non-volatile storage area 1868 synchronized with corresponding information stored at the host computer. As should be appreciated, other applications may be loaded into the memory 1862 and run on the mobile computing device 1800.

According to an aspect, the system 1802 has a power supply 1870, which is implemented as one or more batteries. According to an aspect, the power supply 1870 further includes an external power source, such as an AC adapter or a powered docking cradle that supplements or recharges the batteries.

According to an aspect, the system 1802 includes a radio 1872 that performs the function of transmitting and receiving radio frequency communications. The radio 1872 facilitates wireless connectivity between the system 1802 and the "outside world," via a communications carrier or service provider. Transmissions to and from the radio 1872 are conducted under control of the operating system 1864. In other words, communications received by the radio 1872 may be disseminated to the application programs 1850 via the operating system 1864, and vice versa.

According to an aspect, the visual indicator 1820 is used to provide visual notifications and/or an audio interface 1874 is used for producing audible notifications via the audio transducer 1825. In the illustrated example, the visual indicator 1820 is a light emitting diode (LED) and the audio transducer 1825 is a speaker. These devices may be directly coupled to the power supply 1870 so that when activated, they remain on for a duration dictated by the notification mechanism even though the processor 1860 and other components might shut down for conserving battery power. The LED may be programmed to remain on indefinitely until the user takes action to indicate the powered-on status of the device. The audio interface 1874 is used to provide audible signals to and receive audible signals from the user. For example, in addition to being coupled to the audio transducer 1825, the audio interface 1874 may also be coupled to a microphone to receive audible input, such as to facilitate a telephone conversation. According to an aspect, the system 1802 further includes a video interface 1876 that enables an operation of an on-board camera 1830 to record still images, video stream, and the like.

According to an aspect, a mobile computing device 1800 implementing the system 1802 has additional features or functionality. For example, the mobile computing device 1800 includes additional data storage devices (removable and/or non-removable) such as, magnetic disks, optical disks, or tape. Such additional storage is illustrated in FIG. 18B by the non-volatile storage area 1868.

According to an aspect, data/information generated or captured by the mobile computing device 1800 and stored via the system 1802 are stored locally on the mobile computing device 1800, as described above. According to another aspect, the data are stored on any number of storage media that are accessible by the device via the radio 1872 or via a wired connection between the mobile computing device 1800 and a separate computing device associated with the mobile computing device 1800, for example, a server computer in a distributed computing network, such as the Internet. As should be appreciated such data/information are accessible via the mobile computing device 1800 via the radio 1872 or via a distributed computing network. Similarly, according to an aspect, such data/information are readily transferred between computing devices for storage and use according to well-known data/information transfer and storage means, including electronic mail and collaborative data/information sharing systems.

FIG. 19 illustrates one example of the architecture of a system for web-scale passage retrieval as described above. Content developed, interacted with, or edited in association with the system 100 is enabled to be stored in different communication channels or other storage types. For example, various documents may be stored using a directory service 1922, a web portal 1924, a mailbox service 1926, an instant messaging store 1928, or a social networking site 1930. The web-scale passage retrieval system 100 is operative to use any of these types of systems or the like for improving search efficiency, as described herein. According to an aspect, a server 1920 provides the web-scale passage retrieval system 100 to clients 1905$a,b,c$. As one example, the server 1920 is a web server providing the system 100 over the web. The server 1920 provides the system 100 over the web to clients 1905 through a network 1940. By way of example, the client computing device is implemented and embodied in a personal computer 1905$a$, a tablet computing device 1905$b$ or a mobile computing device 1905$c$ (e.g., a smart phone), or other computing device. Any of these examples of the client computing device are operable to obtain content from the store 1916.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer implemented method comprising:
    identifying, at a server, a corpus of electronic objects for passage extraction;
    extracting passages from each identified electronic object;
    receiving, at the server, a query from a client computing device;
    ranking extracted passages in each of the electronic objects based on a score that indicates a likelihood that each of the extracted passages directly answers the received query to produce top-ranked passages;
    aggregating the top-ranked passages to form aggregated passages;
    generating for each aggregate passage a caption parsed from content of a corresponding top-ranked passage;
    re-ranking the aggregated passages to form ranked aggregated passages using analysis, by a machine learned model, of the generated captions of the top-ranked passages, wherein the re-ranking is based on a second score that indicates a likelihood that each of the ranked aggregated passages directly answers the received query, the second score based on key entities in the received query and entities in the extracted passages;
    selecting at least one top-ranked passage from the re-ranked aggregated passages; and
    providing, by the server, in an electronic format suitable for display on a display of the client computing device, the generated caption corresponding to the at least one top-ranked passage.

2. The computer implemented method of claim 1, wherein the electronic objects are one of emails, web pages, images, audio files, videos, or documents.

3. The computer implemented method of claim 1, wherein ranking the extracted passages in each of the electronic objects comprises:
    parsing the query to determine query information, wherein the query information comprises at least one of:
    a query semantic meaning;
    query keywords; and
    query entities;
    parsing each of the extracted passages to determine passage information, wherein the passage information comprises at least one of:
    a passage semantic meaning;
    passage keywords; and
    passage entities; and
    generating a machine learning passage ranking model with a variety of semantic features, including, a semantic translation model using the query information and the passage information.

4. The computer implemented method of claim 1, further comprising providing a link to the electronic object from where the passage was retrieved.

5. The computer implemented method of claim 4, wherein the passage and the link are provided to a client device.

6. The computer implemented method of claim 4, wherein the query was received from the client device.

7. The computer implemented method of claim 1, wherein the corpus of electronic objects is stored in a distributed network.

8. The computer implemented method of claim 1, wherein the generated the caption is generated using a second machine learned model different from the machine learned model.

9. A computer implemented method comprising:
    receiving a query;
    determining a semantic intent of the query;
    in response to determining the semantic intent, performing a search, using a search engine, to generate search results, wherein the search results include electronic objects which are ordered according to a rank based on the semantic intent of the query;
    analyzing a plurality of passages from each of at least a subset of the ranked search results to produce a plurality of top-ranked passages from each electronic object;
    aggregating the top-ranked passages from each electronic object for the subset of the ranked search results;
    generating for each aggregate passage a caption parsed from content of a corresponding top-ranked passage;
    ranking the aggregated top-ranked passages to identify a plurality top-ranked aggregated passages using analysis, by a machine learned model, of the generated captions of the top-ranked passages by a machine learned model, wherein the ranking is based on a score that indicates a likelihood that each of the plurality of top-ranked aggregated passages directly answers the received query, the score based on key entities in the received query and entities in the plurality of passages;
    providing, in an electronic format suitable for display on a display device of a client device, the generated caption corresponding to the at least one top-ranked aggregated passage.

10. The computer implemented method of claim 9, further comprising:
    analyzing, using a machine learning model, the query to determine query information, wherein the query information includes the semantic intent of the query;
    analyzing, using the machine learning model, each of the plurality of passages from the subset of the ranked search results to determine passage information;
    generating a machine learning passage ranking model with a variety of semantic features, including, a semantic translation model using the query information and the passage information; and
    placing the passage in an order among other passages of the plurality of passages based on a numerical score.

11. The computer implemented method of claim 9, wherein the electronic objects are one of emails, web pages, audio files, images, videos, or documents.

12. The computer implemented method of claim 9, further comprising providing a link to a web page that contains the at least one top-ranked passage.

13. The computer implemented method of claim 12, wherein the link is returned to the client device.

14. The computer implemented method of claim 13, wherein the query was received from the client device.

15. The computer implemented method of claim 9, wherein the electronic objects are stored in a distributed network.

16. A system comprising a computing device, the computing device comprising:
   at least one processor; and
   a memory for storing and encoding computer executable instructions that, when executed by the at least one processor is operative to:
   receive a query;
   determine a semantic intent of the query based at least upon the query;
   in response to determining the semantic intent, perform a search to generate search results, wherein the search results include electronic objects which are ordered according to a rank based on the semantic intent of the query;
   analyze a plurality of passages from each of at least a subset of the ranked search results to produce a plurality of top-ranked passages;
   aggregate the top-ranked passages for each electronic object for the subset of the ranked search results;
   generating for each aggregate passage a caption parsed from content of a corresponding top-ranked passage;
   rank the aggregated top-ranked passages to identify a plurality of top-ranked aggregated passages using analysis, by a machine learned model, of the generated captions of the top-ranked passages by a machine learned model, wherein the ranking is based on a score that indicates a likelihood that each of the plurality of top-ranked aggregated passages directly answers the received query, the score based on key entities in the received query and entities in the plurality of passages;
   provide, in an electronic format suitable for display on a display device of a client device, the generated caption corresponding to the at least one top-ranked aggregated passage.

17. The system of claim 16, wherein the at least one processor is further operative to:
   analyze, using a machine learning model, the query to determine query information, wherein the query information includes the semantic intent of the query;
   analyze, using the machine learning model, each of the plurality of passages from the subset of the ranked search results to determine passage information;
   generate a machine learning passage ranking model with a variety of semantic features, including, a semantic translation model using the query information and the passage information; and
   place the passage in an order among other passages of the plurality of passages based on a numerical score.

18. The system of claim 16, wherein the electronic objects are one of emails, web pages, or documents.

19. The system of claim 16, wherein the at least one processor is further operative to:
   generate, in an electronic format suitable for display on the display device, a link to a web page that contains the at least one top-ranked passage.

20. The system of claim 19, wherein the link is returned to the client device.

* * * * *